United States Patent
Sargent et al.

(10) Patent No.: US 10,435,628 B2
(45) Date of Patent: Oct. 8, 2019

(54) POLYMERISABLE LC MEDIUM AND POLYMER FILM WITH NEGATIVE OPTICAL DISPERSION

(71) Applicant: MERCK PATENT GMBH, Darmstadt (DE)

(72) Inventors: Joseph Sargent, Southampton (GB); Owain Llyr Parri, Ringwood (GB); Kevin Adlem, Bournemouth (GB); Hassan Arasi, Eastleigh (GB)

(73) Assignee: MERCK PATENT GMBH, Darmstadt (DE)

( * ) Notice: Subject to any disclaimer, the term of this patent is extended or adjusted under 35 U.S.C. 154(b) by 227 days.

(21) Appl. No.: 15/501,746

(22) PCT Filed: Jul. 13, 2015

(86) PCT No.: PCT/EP2015/001434
§ 371 (c)(1),
(2) Date: Feb. 3, 2017

(87) PCT Pub. No.: WO2016/020035
PCT Pub. Date: Feb. 11, 2016

(65) Prior Publication Data
US 2017/0226421 A1    Aug. 10, 2017

(30) Foreign Application Priority Data

Aug. 4, 2014  (EP) ................................ 14002719

(51) Int. Cl.
| | | |
|---|---|---|
| C09K 19/38 | (2006.01) | |
| C09K 19/30 | (2006.01) | |
| C09K 19/32 | (2006.01) | |
| C09K 19/40 | (2006.01) | |
| C08F 222/16 | (2006.01) | |
| G02B 5/30 | (2006.01) | |
| G02F 1/13363 | (2006.01) | |
| C09K 19/04 | (2006.01) | |
| C09K 19/34 | (2006.01) | |

(52) U.S. Cl.
CPC ........ *C09K 19/3809* (2013.01); *C08F 222/16* (2013.01); *C09K 19/3059* (2013.01); *C09K 19/3068* (2013.01); *C09K 19/32* (2013.01); *C09K 19/38* (2013.01); *C09K 19/406* (2013.01); *G02B 5/3016* (2013.01); *G02F 1/13363* (2013.01); *C08F 2800/20* (2013.01); *C09K 2019/0429* (2013.01); *C09K 2019/0448* (2013.01); *C09K 2019/0496* (2013.01); *C09K 2019/3413* (2013.01); *C09K 2019/3419* (2013.01); *C09K 2019/3422* (2013.01); *C09K 2219/03* (2013.01); *G02F 2001/133633* (2013.01)

(58) Field of Classification Search
CPC .......................... C09K 19/3809; C08F 222/16
USPC .................................................... 252/299.63
See application file for complete search history.

(56) References Cited

U.S. PATENT DOCUMENTS

| | | |
|---|---|---|
| 8,289,494 B2 | 10/2012 | Parri et al. |
| 8,687,259 B2 | 4/2014 | Adlem et al. |
| 2003/0224175 A1 | 12/2003 | Morita et al. |
| 2010/0110362 A1 | 5/2010 | Parri et al. |
| 2012/0224245 A1 | 9/2012 | Adlem et al. |

FOREIGN PATENT DOCUMENTS

| | | |
|---|---|---|
| JP | 2014078036 A | 5/2014 |
| WO | 2008119427 A1 | 10/2008 |
| WO | 2011050896 A1 | 5/2011 |

OTHER PUBLICATIONS

International Search Report for PCT/EP2015/001434 dated Oct. 12, 2015.
English Abstract for JP2014078036, Publication Date: May 1, 2014.

*Primary Examiner* — Fred M Teskin
(74) *Attorney, Agent, or Firm* — Millen White Zelano & Branigan, PC

(57) ABSTRACT

The invention relates to a polymerizable LC medium with negative optical dispersion, a polymer film with negative optical dispersion obtainable from such a medium, and the use of the polymerizable LC medium and polymer film in optical, electro optical, electronic, semiconducting or luminescent components or devices.

24 Claims, 4 Drawing Sheets

POLYMERISABLE LC MEDIUM AND POLYMER FILM WITH NEGATIVE OPTICAL DISPERSION

FIELD OF THE INVENTION

The invention relates to a polymerisable LC medium with negative optical dispersion, a polymer film with negative optical dispersion obtainable from such a material, and the use of the polymerisable LC medium and polymer film in optical, electro optical, electronic, semiconducting or luminescent components or devices.

BACKGROUND AND PRIOR ART

Prior art describes improved birefringent optical films with negative optical retardation dispersion which are suitable for use as achromatic optical retarders or compensators in liquid crystal (LC) displays. For example, WO 2008/119427 A1 describes a birefringent polymer film with negative optical dispersion, which is obtainable from a polymerisable LC material comprising as negative dispersion component compounds having the structure shown below or derivatives thereof:

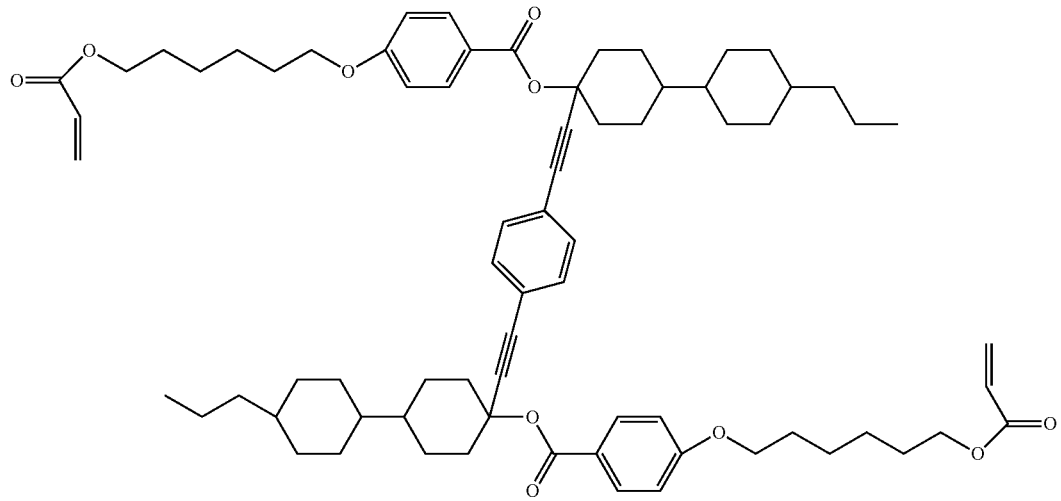 [SMILES: C=CC(=O)OCCCCCCOc1ccc(C(=O)OC2(C#Cc3ccc(C#CC4(OC(=O)c5ccc(OCCCCCCOC(=O)C=C)cc5)CCC(C5CCC(CCC)CC5)CC4)cc3)CCC(C3CCC(CCC)CC3)CC2)cc1]

The ratio of the negative dispersion component in the polymerisable LC material disclosed in WO 2008/119427 A1 is for example 50-60% of the total amount of solids (i.e. without solvents).

However, the bulky nature of the negative dispersion compounds according to the prior art are typically hard to align or give formulations with a narrow process window for annealing temperature, which is not convenient for mass production.

Moreover, the durability of the negative dispersion formulations according to the prior art is poor compared with standard positive dispersion formulations.

Thus, the negative dispersion materials disclosed in prior art still leave room for further improvements. For example, it is desired to reduce the amount of the usually costly negative dispersion compounds in the polymerisable mixture. Also, since the retardation of an optical retardation film is given by the product of its birefringence and film thickness, and thinner films are generally preferred in flat panel display applications, it is desired to increase the birefringence of the film so that the film thickness can be reduced while achieving the same retardation.

The films with negative dispersion can be used for example as A plate or C plate retarders. A positive A plate retarder is suitable for example for use in a circular polarizer, for example in an OLED panel to reduce reflections and therefore increase the contrast ratio. A positive C plate retarder is suitable for example for use as a component in an IPS mode LCD compensator film.

Also, the negative dispersion compounds and the polymerisable LC media comprising them, which are used for film preparation, should exhibit good thermal properties, in particular a modest melting point, a good solubility in the LC host and in organic solvents, and reasonable extrapolated clearing point, and should further exhibit excellent optical properties. Also, they should be suitable for making commercially viable quarter wave films in a large scale manufacturing process.

This invention has the aim of providing improved polymer films and polymerisable LC media for their preparation, which do not have the drawbacks of the prior art materials and have the advantages mentioned above and below.

Another aim of the invention is to extend the pool of polymer films and materials having negative dispersion that are available to the expert. Other aims are immediately evident to the expert from the following description.

It has been found that these aims can be achieved by providing polymerisable LC media and polymer films as claimed in the present invention.

SUMMARY OF THE INVENTION

The invention relates to a polymerisable liquid crystalline (LC) medium comprising one or more compounds of formula A,

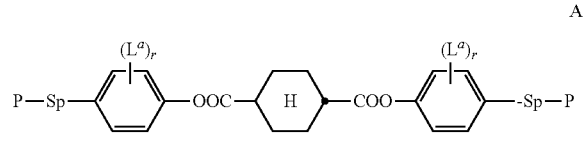

wherein
P is independently of one another, a polymerisable group, preferably having one of the meanings given for P below, and is more preferably an acryl, methacryl, oxetane, 3-ethyloxetane, epoxy, vinyloxy or styrene group,
Sp is a spacer group or a single bond, preferably having one of the meanings given for Sp' below,
$L^a$ is, in case of multiple occurrence identically or differently F, Cl, CN, SCN, $SF_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms,
r is 0, 1, 2, 3 or 4,
and one or more compounds of formula I, $$R^1-(A^1-Z^1)_m-U^1-(Z^2-A^2)_n-R^2$$
$$|$$
$$(B)_q$$
$$|$$
$$R^3-(A^3-Z^3)_o-U^2-(Z^4-A^4)_p-R^4$$

wherein
$U^{1,2}$ are independently of each other selected from including their mirror images, wherein the rings $U^1$ and $U^2$ are each bonded to the group $-(B)_q-$ via the axial bond, and one or two non-adjacent $CH_2$ groups in these rings are optionally replaced by O and/or S, and the rings $U^1$ and $U^2$ are optionally substituted by one or more groups L,
$Q^{1,2}$ are independently of each other CH or SiH,
$Q^3$ is C or Si,
B is in each occurrence independently of one another $-C\equiv C-$, $-CY^1=CY^2-$ or an optionally substituted aromatic or heteroaromatic group,
$Y^{1,2}$ are independently of each other H, F, Cl, CN or $R^0$,
q is an integer from 1 to 10, preferably 1, 2, 3, 4, 5, 6 or 7,
$A^{1-4}$ are independently of each other selected from non-aromatic, aromatic or heteroaromatic carbocyclic or heterocyclic groups, which are optionally substituted by one or more groups $R^5$, and wherein each of $-(A^1-Z^1)_m-U^1-(Z^2-A^2)_n-$ and $-(A^3-Z^3)_o-U^2-(Z^4-A^4)_p-$ does not contain more aromatic groups than non-aromatic groups and preferably does not contain more than one aromatic group,
$Z^{1-4}$ are independently of each other $-O-$, $-S-$, $-CO-$, $-COO-$, $-OCO-$, $-O-COO-$, $-CO-NR^0-$, $-NR^0-CO-$, $-NR^0-CO-NR^0-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-(CH_2)_3-$, $-(CH_2)_4-$, $-CF_2CH_2-$, $-CH_2CF_2-$, $-CF_2CF_2-$, $-CH=CH-$, $-CY^1=CY^2-$, $-CH=N-$, $-N=CH-$, $-N=N-$, $-CH=CR^0-$, $-C\equiv C-$, $-CH=CH-COO-$, $-OCO-CH=CH-$, $CR^0R^{00}$ or a single bond,
$R^0$ and $R^{00}$ are independently of each other H or alkyl with 1 to 12 C-atoms,
m and n are independently of each other 0, 1, 2, 3 or 4,
o and p are independently of each other 0, 1, 2, 3 or 4,
$R^{1-5}$ are independently of each other identical or different groups selected from H, halogen, $-CN$, $-NC$, $-NCO$, $-NCS$, $-OCN$, $-SCN$, $-C(=O)NR^0R^{00}$, $-C(=O)X^0$, $-C(=O)R^0$, $-NH_2$, $-NR^0R^{00}$, $-SH$, $-SR^0$, $-SO_3H$, $-SO_2R^0$, $-OH$, $-NO_2$, $-CF_3$, $-SF_5$, P-Sp-, optionally substituted silyl, or carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-,
P is a polymerisable group,
Sp is a spacer group or a single bond.

In comparison with the prior art formulations, the amount of negative dispersion compounds of formula I required in the polymerisable liquid crystalline medium according to the present invention is significantly reduced and by using the low dispersion reactive mesogens of formula A the same dispersion value for the medium is maintained.

The lowered amount of negative dispersion compounds of formula I together with the use of the low dispersion reactive mesogens of formula A, leads to improved durability, wider annealing temperature process windows and a lower cost formulations.

Alternatively, the level of dopant of negative dispersion compounds of formula I can be maintained at the same level and by using the low dispersion reactive mesogens of formula A, the dispersion of the medium can be further reduced.

Thus, the invention in particular relates to a polymerisable LC medium or polymer film as described above and below, having negative retardation dispersion, i.e. with $R_{450}/R_{550}<1$, preferably <0.9, especially <0.8, wherein $R_{450}$ is the optical on-axis retardation at a wavelength of 450 nm and $R_{550}$ is the optical on-axis retardation at a wavelength of 550 nm.

The invention further relates to the use of a polymerisable LC medium or polymer film as described above and below in optical, electronic and electro optical components and devices, preferably in optical films, retarders or compensators having negative optical dispersion.

The invention further relates to a birefringent polymer film being obtainable or obtained by polymerising a polymerisable LC medium as described above and below, preferably in its LC phase in an oriented state in form of a thin film.

The invention especially relates to a polymer film as described above and below, which is an A plate or a C plate, preferably a positive A plate (+A plate) or positive C plate (+C plate).

The invention further relates to an optical, electronic or electro optical component or device, comprising a polymerisable LC medium or a polymer film as described above and below.

Said devices and components include, without limitation, electro optical displays, LCDs, optical films, retarders, compensators, polarisers, beam splitters, reflective films, alignment layers, colour filters, holographic elements, hot stamping foils, colored images, decorative or security markings, LC pigments, adhesives, non-linear optic (NLO) devices, optical information storage devices, electronic devices, organic semiconductors, organic field effect transistors (OFET), integrated circuits (IC), thin film transistors (TFT), Radio Frequency Identification (RFID) tags, organic light emitting diodes (OLED), organic light emitting transistors (OLET), electroluminescent displays, organic photovoltaic (OPV) devices, organic solar cells (O-SC), organic laser diodes (O-laser), organic integrated circuits (O-IC), lighting devices, sensor devices, electrode materials, photoconductors, photodetectors, electro photographic recording devices, capacitors, charge injection layers, Schottky diodes, planarising layers, antistatic films, conducting substrates, conducting patterns, photoconductors, electro photographic applications, electro photographic recording, organic memory devices, biosensors, biochips.

Terms and Definitions

The term "liquid crystal or mesogenic compound" means a compound comprising one or more calamitic (rod- or board/lath-shaped) or discotic (disk-shaped) mesogenic groups. The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds, or when the mesogenic compounds or materials, or the mixtures thereof, are polymerised. For the sake of simplicity, the term "liquid crystal" is used hereinafter for both mesogenic and LC materials. For an overview of definitions see C. Tschierske, G. PelzI and S. Diele, Angew. Chem. 2004, 116, 6340-6368.

A calamitic mesogenic group is usually comprising a mesogenic core consisting of one or more aromatic or non-aromatic cyclic groups connected to each other directly or via linkage groups, optionally comprising terminal groups attached to the ends of the mesogenic core, and optionally comprising one or more lateral groups attached to the long side of the mesogenic core, wherein these terminal and lateral groups are usually selected e.g. from carbyl or hydrocarbyl groups, polar groups like halogen, nitro, hydroxy, etc., or polymerisable groups.

The term "reactive mesogen" (RM) means a polymerisable mesogenic or liquid crystal compound.

Polymerisable compounds with one polymerisable group are also referred to as "monoreactive" compounds, compounds with two polymerisable groups as "direactive" compounds, and compounds with more than two polymerisable groups as "multireactive" compounds. Compounds without a polymerisable group are also referred to as "non-reactive" compounds.

A polymerisable group (P) is a group that is capable of participating in a polymerisation reaction, like radical or ionic chain polymerisation, polyaddition or polycondensation, or capable of being grafted, for example by condensation or addition, to a polymer backbone in a polymer analogous reaction.

Polymerisation can be carried out according to methods that are known to the ordinary expert and described in the literature, for example in D. J. Broer; G. Challa; G. N. Mol, *Macromol. Chem,* 1991, 192, 59.

Especially preferred are polymerisable groups for chain polymerisation reactions, like radical, cationic or anionic polymerisation. Very preferred are polymerisable groups comprising a C—C double or triple bond, and polymerisable groups capable of polymerisation by a ring-opening reaction, like oxetanes or epoxides.

Suitable and preferred polymerisable groups include, without limitation, $CH_2=CW^1-COO-$, $CH_2=CW^1-CO-$,

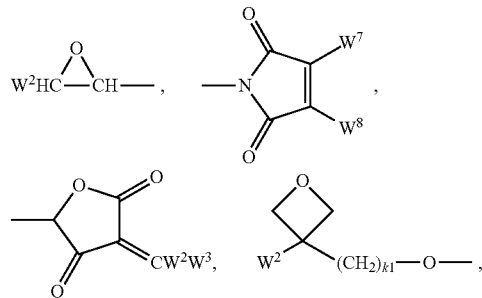

$CH_2=CW^2-(O)_{k1}-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH—, $HOOC-$, $OCN-$, and $W^4W^5W^6Si-$, with $W^1$ being H, F, Cl, CN, $CF_3$, phenyl or alkyl with 1 to 5 C-atoms, in particular H, F, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted, preferably by one or more groups L as defined above (except for the meaning P-Sp-), and $k_1$ and $k_2$ being independently of each other 0 or 1.

Very preferred polymerisable groups are selected from $CH_2=CW^1-COO-$, $CH_2CW^1-CO-$,

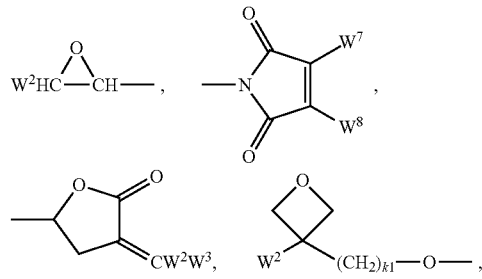

$(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH—, $HOOC-$, $OCN-$, and $W^4W^5W^6Si-$, with $W^1$ being H, F, Cl, CN, $CF_3$, phenyl or alkyl with 1 to 5 C-atoms, in particular H, F, Cl or $CH_3$, $W^2$ and $W^3$ being independently of each other H or alkyl with 1 to 5 C-atoms, in particular H, methyl, ethyl or n-propyl, $W^4$, $W^5$ and $W^6$ being independently of each other Cl, oxaalkyl or oxacarbonylalkyl with 1 to 5 C-atoms, $W^7$ and $W^8$ being independently of each other H, Cl or alkyl with 1 to 5 C-atoms, Phe being 1,4-phenylene that is optionally substituted preferably by one or more groups L as defined above (except for the meaning P-Sp-), and $k_1$ and $k_2$ being independently of each other 0 or 1.

Most preferred polymerisable groups are selected from $CH_2$=CH—COO—, $CH_2$=C($CH_3$)—COO—, $CH_2$=CF—COO—, $(CH_2$=CH$)_2$CH—OCO—, $(CH_2$=CH$)_2$CH—O—,

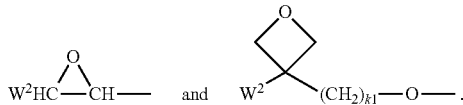

and

The term "spacer group" is known in prior art and suitable spacer groups, are known to the skilled person (see e.g. Pure Appl. Chem. 73(5), 888 (2001). The spacer group (Sp) is preferably selected of formula Sp'-X', such that P-Sp- denotes P-Sp'-X'—, wherein Sp' is alkylene with 1 to 20 C atoms, preferably 1 to 12 C-atoms, which is optionally mono- or polysubstituted by F, Cl, Br, I or CN, and wherein one or more non-adjacent $CH_2$ groups are optionally replaced, in each case independently from one another, by —O—, —S—, —NH—, —$NR^0$—, —$SiR^0R^{00}$—, —CO—, —COO—, —OCO—, —OCO—O—, —S—CO—, —CO—S—, —$NR^0$—CO—O—, —O—CO—$NR^0$—, —$NR^0$—CO—$NR^0$—, —CH=CH— or —C≡C— in such a manner that O and/or S atoms are not linked directly to one another, X' is —O—, —S—, —CO—, —COO—, —OCO—, —O—COO—, —CO—$NR^0$—, —$NR^0$—CO—, —$NR^0$—CO—$NR^0$—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=$CR^0$—, —$CY^1$=$CY^2$—, —C≡C—, —CH=CH—COO—, —OCO—CH=CH— or a single bond, $R^0$ and $R^{00}$ are independently of each other H or alkyl with 1 to 12 C-atoms, and $Y^1$ and $Y^2$ are independently of each other H, F, Cl or CN. X' is preferably —O—, —S—CO—, —COO—, —OCO—, —O—COO—, —CO—$NR^0$—, —$NR^0$—CO—, —$NR^0$—CO—$NR^0$— or a single bond.

Typical groups Sp' are, for example, —(CH$_2$)$_{p1}$—, —(CH$_2$CH$_2$O)$_q$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_{p1}$—, with p1 being an integer from 2 to 12, q1 being an integer from 1 to 3 and $R^0$ and $R^{00}$ having the meanings given above.

Preferred groups Sp' are ethylene, propylene, butylene, pentylene, hexylene, heptylene, octylene, nonylene, decylene, undecylene, dodecylene, octadecylene, ethyleneoxyethylene, methyleneoxy-butylene, ethylene-thioethylene, ethylene-N-methyl-iminoethylene, 1-methylalkylene, ethenylene, propenylene and butenylene for example. Further preferred are chiral spacer groups.

Further preferred are compounds wherein the polymerisable group is directly attached to the mesogenic group without a spacer group Sp.

In case of compounds with two or more groups P-Sp-, the polymerisable groups P and the spacer groups Sp can be identical or different.

The term "film" includes rigid or flexible, self-supporting or free-standing films with mechanical stability, as well as coatings or layers on a supporting substrate or between two substrates.

The term "carbyl group" means any monovalent or multivalent organic radical moiety which comprises at least one carbon atom either without any non-carbon atoms (like for example —C≡C—), or optionally combined with at least one non-carbon atom such as N, O, S, P, Si, Se, As, Te or Ge (for example carbonyl etc.). The term "hydrocarbyl group" denotes a carbyl group that does additionally contain one or more H atoms and optionally contains one or more hetero atoms like for example N, O, S, P, Si, Se, As, Te or Ge. A carbyl or hydrocarbyl group comprising a chain of 3 or more C atoms may also be linear, branched and/or cyclic, including spiro and/or fused rings.

On the molecular level, the birefringence of a liquid crystal depends on the anisotropy of the polarizability ($\Delta\alpha = \alpha_\parallel - \alpha_\perp$). "Polarizability" means the ease with which the electron distribution in the atom or molecule can be distorted. The polarizability increases with greater number of electrons and a more diffuse electron cloud. The polarizability can be calculated using a method described in e.g. Jap. J. Appl. Phys. 42, (2003) p. 3463.

The "optical retardation" at a given wavelength $R(\lambda)$ (in nm) of a layer of liquid crystalline or birefringent material is defined as the product of birefringence at that wavelength $\Delta n(\lambda)$ and layer thickness d (in nm) according to the equation $$R(\lambda) = \Delta n(\lambda) \cdot d$$

The optical retardation R represents the difference in the optical path lengths in nanometers travelled by S-polarised and P-polarised light whilst passing through the birefringent material. "On-axis" retardation means the retardation at normal incidence to the sample surface.

The term "negative (optical) dispersion" refers to a birefringent or liquid crystalline material or layer that displays reverse birefringence dispersion where the magnitude of the birefringence ($\Delta n$) increases with increasing wavelength ($\lambda$). i.e. $|\Delta n(450)| < |\Delta n(550)|$, or $\Delta n(450)/\Delta n(550) < 1$, where $\Delta n(450)$ and $\Delta n(550)$ are the birefringence of the material measured at wavelengths of 450 nm and 550 nm respectively. In contrast, positive (optical) dispersion" means a material or layer having $|\Delta n(450)| > |\Delta n(550)|$ or $\Delta n(450)/\Delta n(550) > 1$. See also for example A. Uchiyama, T. Yatabe "Control of Wavelength Dispersion of Birefringence for Oriented Copolycarbonate Films Containing Positive and Negative Birefringent Units". J. Appl. Phys. Vol. 42 pp 6941-6945 (2003).

Since the optical retardation at a given wavelength is defined as the product of birefringence and layer thickness as described above [$R(\lambda) = \Delta n(\lambda) \cdot d$], the optical dispersion can be expressed either as the "birefringence dispersion" by the ratio $\Delta n(450)/\Delta n(550)$, or as "retardation dispersion" by the ratio $R(450)/R(550)$, wherein $R(450)$ and $R(550)$ are the retardation of the material measured at wavelengths of 450 nm and 550 nm respectively. Since the layer thickness d does not change with the wavelength, $R(450)/R(550)$ is equal to $\Delta n(450)/\Delta n(550)$. Thus, a material or layer with negative or reverse dispersion has $R(450)/R(550) < 1$ or $|R(450)| < |R(550)|$, and a material or layer with positive or normal dispersion has $R(450)/R(550) > 1$ or $|R(450)| > |R(550)|$.

In the present invention, unless stated otherwise "optical dispersion" means the retardation dispersion i.e. the ratio $R(450)/R(550)$.

The term "high dispersion" means that the absolute value of the dispersion shows a large deviation from 1, whereas the term "low dispersion" means that the absolute value of the dispersion shows a small deviation from 1. Thus "high negative dispersion" means that the dispersion value is significantly smaller than 1, and "low negative dispersion" means that the dispersion value is only slightly smaller than 1.

The retardation (R(λ)) of a material can be measured using a spectroscopic ellipsometer, for example the M2000 spectroscopic ellipsometer manufactured by J. A. Woollam Co., This instrument is capable of measuring the optical retardance in nanometers of a birefringent sample e.g. Quartz over a range of wavelengths typically, 370 nm to 2000 nm. From this data it is possible to calculate the dispersion (R(450)/R(550) or Δn(450)/Δn(550)) of a material.

A method for carrying out these measurements was presented at the National Physics Laboratory (London, UK) by N. Singh in October 2006 and entitled "Spectroscopic Ellipsometry, Part 1-Theory and Fundamentals, Part 2—Practical Examples and Part 3—measurements". In accordance with the measurement procedures described Retardation Measurement (RetMeas) Manual (2002) and Guide to WVASE (2002) (Woollam Variable Angle Spectroscopic Ellipsometer) published by J. A. Woollam Co. Inc (Lincoln, Nebr., USA). Unless stated otherwise, this method is used to determine the retardation of the materials, films and devices described in this invention.

The term "A plate" refers to an optical retarder utilizing a layer of uniaxially birefringent material with its extraordinary axis oriented parallel to the plane of the layer. The term "C plate" refers to an optical retarder utilizing a layer of uniaxially birefringent material with its extraordinary axis oriented perpendicular to the plane of the layer. In A/C-plates comprising optically uniaxial birefringent liquid crystal material with uniform orientation, the optical axis of the film is given by the direction of the extraordinary axis. An A (or C) plate comprising optically uniaxial birefringent material with positive birefringence is also referred to as "positive A (or C) plate" or "+A (or +C) plate". An A (or C) plate comprising a film of optically uniaxial birefringent material with negative birefringence, such as discotic anisotropic materials is also referred to as "negative A (or C) plate" or "−A (or C) plate" depending on the orientation of the discotic materials. A film made from a cholesteric calamitic material with a reflection band in the UV part of the spectrum also has the optics of a negative C plate.

DETAILED DESCRIPTION OF THE INVENTION

Preferably, the polymerisable LC medium comprises one, two or more compounds of formula A, more preferably one compound of formula A.

Preferably, the amount of compounds of formula A in the polymerisable LC medium as a whole is in the range from 1 to 40 wt. %, preferably from 5 to 35 wt. %.

Preferably, the polymerisable LC medium comprises one, two or more compounds of formula I, more preferably one compound of formula I.

Preferably, the amount of compounds of formula I in the polymerisable LC medium as a whole is below 50 wt. %, in particular in the range from 25 to 45 wt. %, and especially in the range from 30 to 40 wt. %.

In a preferred embodiment, the compounds of formula A are selected from the following sub formulae,

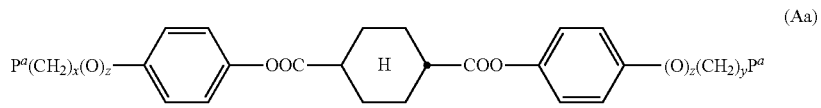

(Aa)

wherein the parameter P has one of the meanings as given above under formula A and x, y, z, are independently of each other 0 or identical or different integers from 1 to 12.

Furthermore, preference is given to a polymerisable LC medium wherein the compounds of formula A are selected from the following sub formulae,

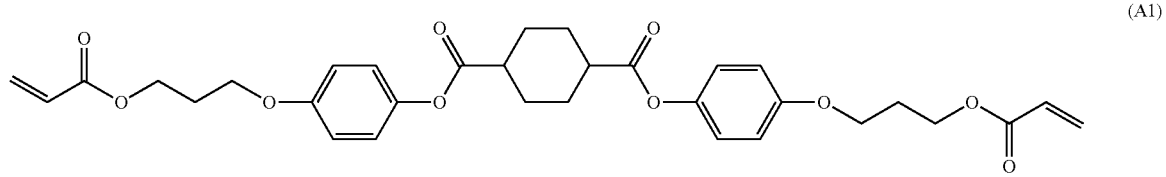

(A1)

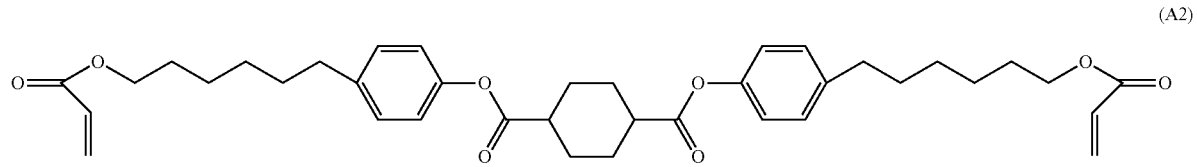

(A2)

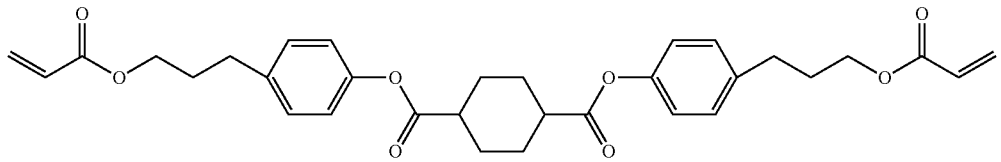

(A3)

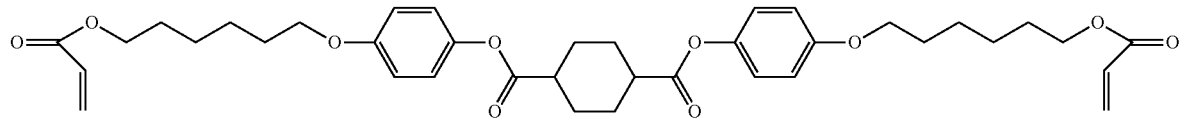

(A4)

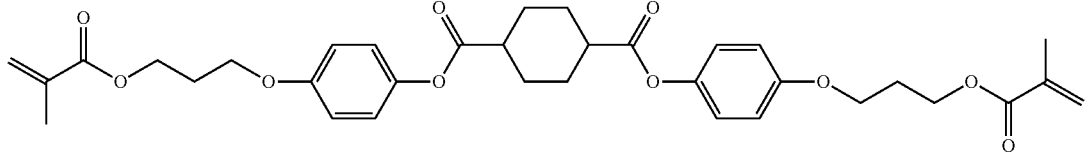

(A5)

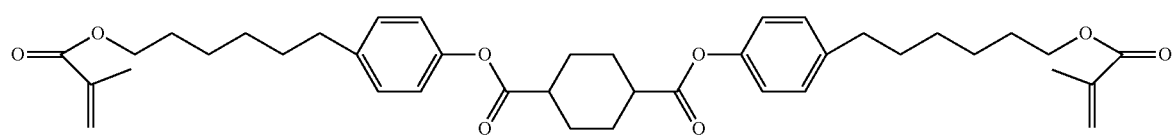

(A6)

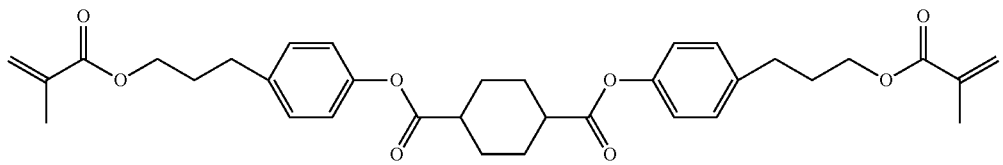

(A7)

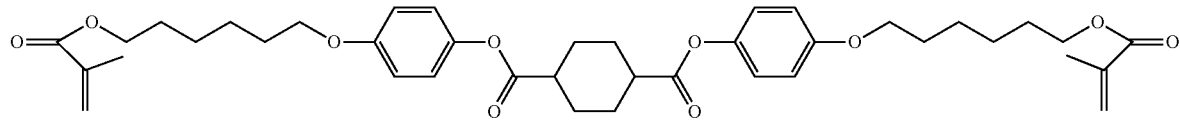

(A8)

In a further preferred embodiment, the compounds of formula A are selected from the group of compounds of formula A2 or A6, in particular a compound of formula A2.

In another preferred embodiment, the subgroups forming the bridging group B in formula I are preferably selected from groups having a bonding angle of 120° or more, preferably in the range of 180°. Very preferred are —C≡C— groups or divalent aromatic groups connected to their adjacent groups in para-position, like e.g. 1,4-phenylene, naphthalene-2,6-diyl, indane-2,6-diyl or thieno[3,2-b]thiophene-2,5-diyl.

Further possible subgroups include —CH=CH—, —CY$^1$=CY$^2$—, —CH=N—, —N=CH—, —N=N— and —CH=CR$^0$— wherein Y$^1$, Y$^2$, R$^0$ have the meanings given above.

Preferably the bridging group, or —(B)$_q$— in formula I, comprises one or more groups selected from the group consisting of —C≡C—, optionally substituted 1,4-phenylene and optionally substituted 9H-fluorene-2,7-diyl. The subgroups, or B in formula I, are preferably selected from the group consisting of —C≡C—, optionally substituted 1,4-phenylene and optionally substituted 9H-fluorene-2,7-diyl, wherein in the fluorene group the H-atom in 9-position is optionally replaced by a carbyl or hydrocarbyl group.

Very preferably the bridging group, or —(B)$_q$— in formula I, are selected from —C≡C—, —C≡C—C≡C—, —C≡C—C≡C—C≡C—, —C≡C—C≡C—C≡C—C≡C—,

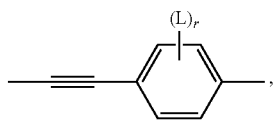

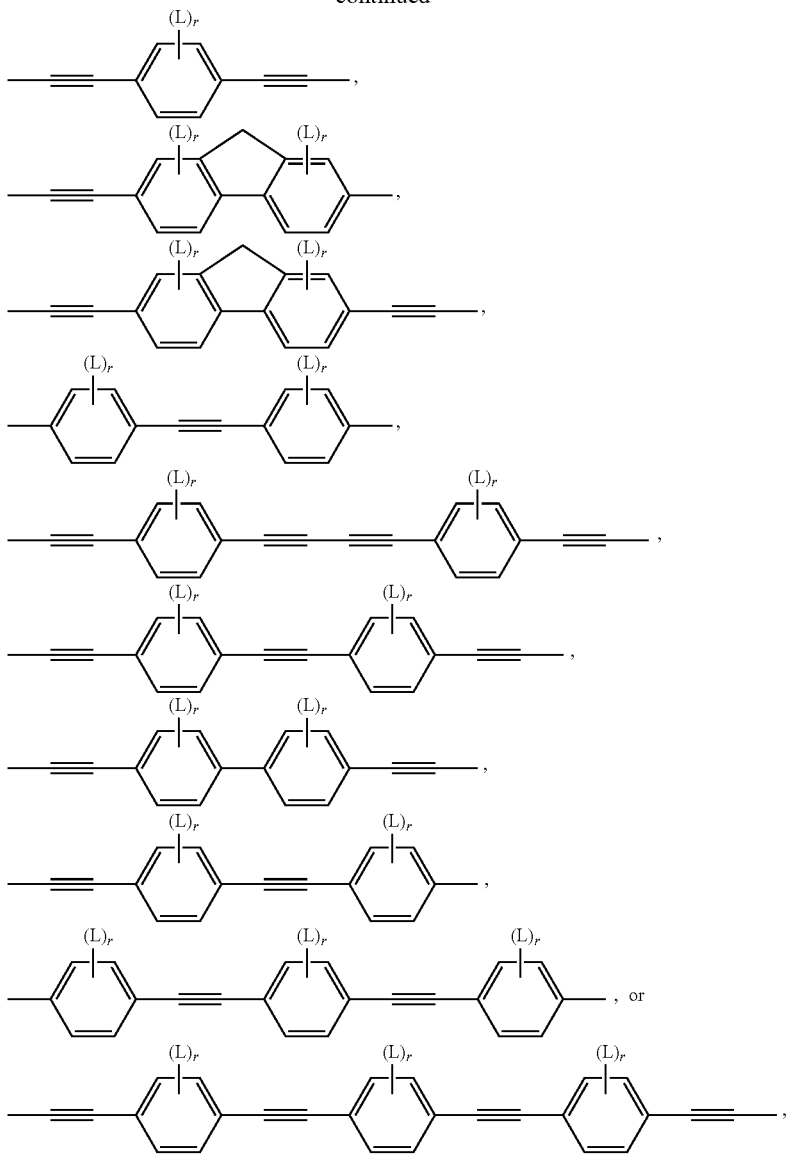

wherein r is 0, 1, 2, 3 or 4 and L has the meaning as described below.

In the guest compounds of the present invention, the non-aromatic rings of the mesogenic groups where the bridging group is attached, like $U^1$ and $U^2$ in formula I, are preferably selected from

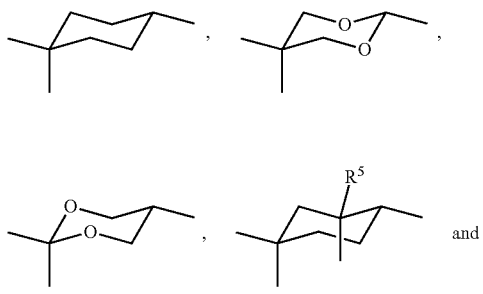

and

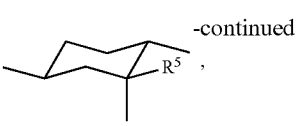

wherein $R^5$ is as defined in formula I.

Preferably, the aromatic groups $A^{1-4}$ in formula I, may be mononuclear, i.e. having only one aromatic ring (like for example phenyl or phenylene), or polynuclear, i.e. having two or more fused rings (like for example napthyl or naphthylene). Especially preferred are mono-, bi- or tricyclic aromatic or heteroaromatic groups with up to 25 C atoms that may also comprise fused rings and are optionally substituted.

Preferred aromatic groups include, without limitation, benzene, biphenylene, triphenylene, [1,1':3',1'' ]terphenyl-2'-ylene, naphthalene, anthracene, binaphthylene, phenanthrene, pyrene, dihydropyrene, chrysene, perylene, tetracene, pentacene, benzpyrene, fluorene, indene, indenofluorene, spirobifluorene, etc.

Preferred heteroaromatic groups include, without limitation, 5-membered rings like pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings like pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, and fused systems like carbazole, indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, dithienopyridine, isobenzothiophene, dibenzothiophene, benzothiadiazothiophene, or combinations thereof.

In the compounds of formula I, the non-aromatic carbocyclic and heterocyclic rings $A^{1-4}$, include those which are saturated (also referred to as "fully saturated"), i.e. they do only contain C-atoms or hetero atoms connected by single bonds, and those which are unsaturated (also referred to as "partially saturated"), i.e. they also comprise C-atoms or hetero atoms connected by double bonds. The non-aromatic rings may also comprise one or more hetero atoms, preferably selected from Si, O, N and S.

The non-aromatic carbocyclic and heterocyclic groups may be mononuclear, i.e. having only one ring (like for example cyclohexane), or polynuclear, i.e. having two or more fused rings (like for example decahydronaphthalene or bicyclooctane). Especially preferred are fully saturated groups. Further preferred are mono-, bi- or tricyclic non-aromatic groups with up to 25 C atoms that optionally comprise fused rings and are optionally substituted. Very preferred are 5-, 6-, 7- or 8-membered carbocyclic rings wherein one or more non-adjacent C-atoms are optionally replaced by Si and/or one or more non-adjacent CH groups are optionally replaced by N and/or one or more non-adjacent $CH_2$ groups are optionally replaced by —O— and/or —S—, all of which are optionally substituted.

Preferred non-aromatic groups include, without limitation, 5-membered rings like cyclopentane, tetrahydrofuran, tetrahydrothiofuran, pyrrolidine, 6-membered rings like cyclohexane, silinane, cyclohexene, tetrahydropyran, tetrahydrothiopyran, 1,3-dioxane, 1,3-dithiane, piperidine, 7-membered rings like cycloheptane, and fused systems like bicyclo[2.2.2]octane, tetrahydronaphthalene, decahydronaphthalene, indane, or combinations thereof.

Preferably the non-aromatic and aromatic rings, or $A^{1-4}$ in formula I, are selected from trans-1,4-cyclohexylene and 1,4-phenylene that is optionally substituted with one or more groups L.

Very preferred are compounds of formula I wherein m and p are 1 and n and o are 1 or 2. Further preferred are compounds of formula I wherein m and p are 1 or 2 and n and o are 0. Further preferred are compounds wherein m, n, o and p are 2.

In the compounds of formula I, the linkage groups connecting the aromatic and non-aromatic cyclic groups in the mesogenic groups, or $Z^{1-4}$, are preferably selected from —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, very preferably from —COO—, —OCO— and a single bond.

Preferably, in the compounds of formula I, the substituents on the rings, such as L, are preferably selected from P-Sp-, F, Cl, Br, I, —CN, —$NO_2$, —NCO, —NCS, —OCN, —SCN, —C(=O)$NR^0R^{00}$, —C(=O)X, —C(=O)$OR^0$, —C(=O)$R^0$, —$NR^0R^{00}$, —OH, —$SF_5$, optionally substituted silyl, aryl or heteroaryl with 1 to 12, preferably 1 to 6 C atoms, and straight chain or branched alkyl, alkoxy, alkylcarbonyl, alkoxycarbonyl, alkylcarbonyloxy or alkoxycarbonyloxy with 1 to 12, preferably 1 to 6 C atoms, wherein one or more H atoms are optionally replaced by F or Cl, wherein $R^0$ and $R^{00}$ are as defined in formula I and X is halogen.

Preferred substituents are selected from F, Cl, CN, $NO_2$ or straight chain or branched alkyl, alkoxy, alkylcarbonyl, alkoxycarbonyl, alkylcarbonlyoxy or alkoxycarbonyloxy with 1 to 12 C atoms, wherein the alkyl groups are optionally perfluorinated, or P-Sp-.

Very preferred substituents are selected from F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, in particular F, Cl, CN, $CH_3$, $C_2H_5$, $C(CH_3)_3$, $CH(CH_3)_2$, $OCH_3$, $COCH_3$ or $OCF_3$, most preferably F, Cl, $CH_3$, $C(CH_3)_3$, $OCH_3$ or $COCH_3$, or P-Sp-.

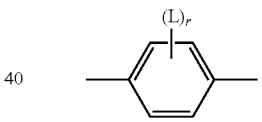

is preferably

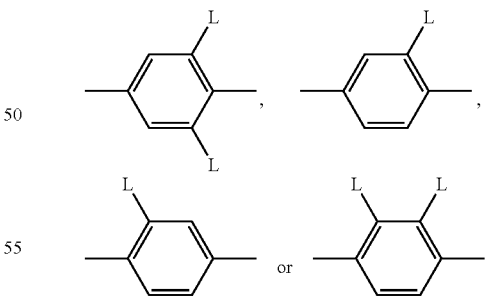

with L having each independently one of the meanings given above.

Preferably, the carbyl and hydrocarbyl groups, such as $R^{1-5}$ in formula I, are preferably selected from straight-chain, branched or cyclic alkyl with 1 to 40, preferably 1 to 25 C-atoms, which is unsubstituted, mono- or polysubstituted by F, Cl, Br, I or CN, and wherein one or more non-adjacent $CH_2$ groups are optionally replaced, in each case independently from one another, by —O—, —S—, —NH—, —NR$^O$—, —SiR$^O$R—, —CO—, —COO—, —OCO—, —O—CO—O—, —S—CO—, —CO—S—, —SO$_2$—, —CO—NR$^O$—, —NR$^O$—CO—, —NR$^O$—CO—NR$^{OO}$—, —CY$^1$=CY$^2$— or —C≡C— in such a manner that O and/or S atoms are not linked directly to one another, wherein Y$^1$ and Y$^2$ are independently of each other H, F, Cl or CN, and R$^O$ and R$^{OO}$ are independently of each other H or an optionally substituted aliphatic or aromatic hydrocarbon with 1 to 20 C atoms.

Very preferably the carbyl and hydrocarbyl groups are selected from $C_1$-$C_{20}$-alkyl, $C_1$-$C_{20}$-oxaalkyl, $C_1$-$C_{20}$-alkoxy, $C_2$-$C_{20}$-alkenyl, $C_2$-$C_{20}$-alkynyl, $C_1$-$C_{20}$-thioalkyl, $C_1$-$C_{20}$-silyl, $C_1$-$C_{20}$-ester, $C_1$-$C_{20}$-amino, $C_1$-$C_{20}$-fluoroalkyl.

An alkyl or alkoxy radical, i.e. where the terminal $CH_2$ group is replaced by —O—, can be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one $CH_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

An alkyl group wherein one or more $CH_2$ groups are replaced by —CH=CH— can be straight-chain or branched. It is preferably straight-chain, has 2 to 10 C atoms and accordingly is preferably vinyl, prop-1-, or prop-2-enyl, but-1-, 2- or but-3-enyl, pent-1-, 2-, 3- or pent-4-enyl, hex-1-, 2-, 3-, 4- or hex-5-enyl, hept-1-, 2-, 3-, 4-, 5- or hept-6-enyl, oct-1-, 2-, 3-, 4-, 5-, 6- or oct-7-enyl, non-1-, 2-, 3-, 4-, 5-, 6-, 7- or non-8-enyl, dec-1-, 2-, 3-, 4-, 5-, 6-, 7-, 8- or dec-9-enyl.

Especially preferred alkenyl groups are $C_2$-$C_7$-1E-alkenyl, $C_4$-$C_7$-3E-alkenyl, $C_5$-$C_7$-4-alkenyl, $C_6$-$C_7$-5-alkenyl and $C_7$-6-alkenyl, in particular $C_2$-$C_7$-1E-alkenyl, $C_4$-$C_7$-3E-alkenyl and $C_5$-$C_7$-4-alkenyl. Examples for particularly preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 C atoms are generally preferred.

In an alkyl group wherein one $CH_2$ group is replaced by —O— and one by —CO—, these radicals are preferably neighboured. Accordingly these radicals together form a carbonyloxy group —CO—O— or an oxycarbonyl group —O—CO—. Preferably this group is straight-chain and has 2 to 6 C atoms. It is accordingly preferably acetyloxy, propionyloxy, butyryloxy, pentanoyloxy, hexanoyloxy, acetyloxymethyl, propionyloxymethyl, butyryloxymethyl, pentanoyloxymethyl, 2-acetyloxyethyl, 2-propionyloxyethyl, 2-butyryloxyethyl, 3-acetyloxypropyl, 3-propionyloxypropyl, 4-acetyloxybutyl, methoxycarbonyl, ethoxycarbonyl, propoxycarbonyl, butoxycarbonyl, pentoxycarbonyl, methoxycarbonylmethyl, ethoxy-carbonylmethyl, propoxycarbonylmethyl, butoxycarbonylmethyl, 2-(methoxycarbonyl)ethyl, 2-(ethoxycarbonyl)ethyl, 2-(propoxy-carbonyl) ethyl, 3-(methoxycarbonyl)propyl, 3-(ethoxycarbonyl) propyl, 4-(methoxycarbonyl)-butyl.

An alkyl group wherein two or more $CH_2$ groups are replaced by —O— and/or —COO— can be straight-chain or branched. It is preferably straight-chain and has 3 to 12 C atoms. Accordingly it is preferably bis-carboxy-methyl, 2,2-bis-carboxy-ethyl, 3,3-bis-carboxy-propyl, 4,4-bis-carboxy-butyl, 5,5-bis-carboxy-pentyl, 6,6-bis-carboxy-hexyl, 7,7-bis-carboxy-heptyl, 8,8-bis-carboxy-octyl, 9,9-bis-carboxy-nonyl, 10,10-bis-carboxy-decyl, bis-(methoxycarbonyl)-methyl, 2,2-bis-(methoxycarbonyl)-ethyl, 3,3-bis-(methoxycarbonyl)-propyl, 4,4-bis-(methoxycarbonyl)-butyl, 5, 5-bis-(methoxycarbonyl)-pentyl, 6,6-bis-(methoxycarbonyl)-hexyl, 7,7-bis-(methoxycarbonyl)-heptyl, 8,8-bis-(methoxycarbonyl)-octyl, bis-(ethoxycarbonyl)-methyl, 2,2-bis-(ethoxycarbonyl)-ethyl, 3,3-bis-(ethoxycarbonyl)-propyl, 4,4-bis-(ethoxycarbonyl)-butyl, 5,5-bis-(ethoxycarbonyl)-hexyl.

An alkyl or alkenyl group that is monosubstituted by CN or $CF_3$ is preferably straight-chain. The substitution by CN or $CF_3$ can be in any desired position.

An alkyl or alkenyl group that is at least monosubstituted by halogen is preferably straight-chain. Halogen is preferably F or Cl, in case of multiple substitutions preferably F. The resulting groups include also perfluorinated groups. In case of monosubstitution the F or Cl substituent can be in any desired position, but is preferably in w-position. Examples for especially preferred straight-chain groups with a terminal F substituent are fluoromethyl, 2-fluorethyl, 3-fluorpropyl, 4-fluorbutyl, 5-fluorpentyl, 6-fluorhexyl and 7-fluorheptyl. Other positions of F are, however, not excluded.

$R^O$ and $R^{OO}$ are preferably selected from H, straight-chain or branched alkyl with 1 to 12 C atoms. —CY$^1$=CY$^2$— is preferably —CH=CH—, —CF=CF— or —CH=C(CN)—.

Halogen is F, Cl, Br or I, preferably F or Cl.

$R^{1-5}$ can be an achiral or a chiral group. Particularly preferred chiral groups are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy.

Preferred achiral branched groups are isopropyl, isobutyl (=methylpropyl), isopentyl (=3-methylbutyl), isopropoxy, 2-methyl-propoxy and 3-methylbutoxy.

In another preferred embodiment the compounds of formula I comprise one or more terminal groups, like $R^{1-4}$, or substituents, like $R^5$, that are substituted by two or more polymerisable groups P or P-Sp-(multifunctional polymerisable groups). Suitable multifunctional polymerisable groups of this type are disclosed for example in U.S. Pat. No. 7,060,200 B1 or US 2006/0172090 A1. Very preferred are compounds comprising one or more multifunctional polymerisable groups selected from the following formulae:

—X-alkyl-CHP$^1$—CH$_2$—CH$_{22}$      P1

—X'-alkyl-C(CH$_2$P$^1$)(CH$_2$P$^2$)—CH$_2$P$^3$      P2

—X'-alkyl-CHP¹CHP²—CH₂P³    P3

—X'-alkyl-C(CH₂P¹)(CH²P²)—C_aH_{2a+1}    P4

—X'-alkyl-CHP¹—CH₂P²    P5

—X'-alkyl-CHP¹P²    P5

—X'-alkyl-CP¹P²—C_aH_{2a+1}    P6

—X'-alkyl-C(CH₂P¹)(CH₂P²)—CH₂OCH₂—C(CH₂P³)(CH₂P⁴)CH₂P⁵    P7

—X'-alkyl-CH((CH₂)_aP¹)((CH₂)_bP²)    P8

—X'-alkyl-CHP¹CHP²—C_aH_{2a+1}    P9 wherein
alkyl is straight-chain or branched alkylene having 1 to 12 C-atoms which is unsubstituted, mono- or polysubstituted by F, Cl, Br, I or CN, and wherein one or more non-adjacent CH₂ groups are optionally replaced, in each case independently from one another, by —O—, —S—, —NH—, —NR⁰—, —SiR⁰R⁰⁰—, —CO—, —COO—, —OCO—, —O—CO—O—, —S—CO—, —CO—S—, —SO₂—, —CO—NR⁰—, —NR⁰—CO—, —NR⁰—CO—NR⁰⁰—, —CY¹=CY²— or —C≡C— in such a manner that O and/or S atoms are not linked directly to one another, with R⁰ and R⁰⁰ having the meanings given above, or denotes a single bond,
a and b are independently of each other 0, 1, 2, 3, 4, 5 or 6,
X' is as defined above, and
P^{1-5} independently of each other have one of the meanings given for P above.

Very preferred compounds of formula I are those of the following sub formulae:

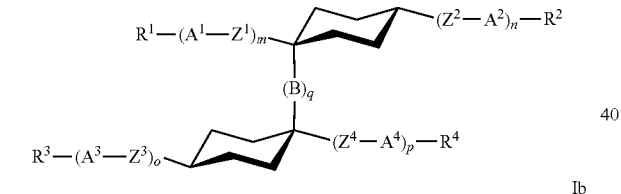

Ia

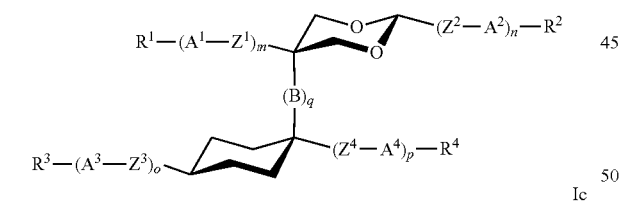

Ib

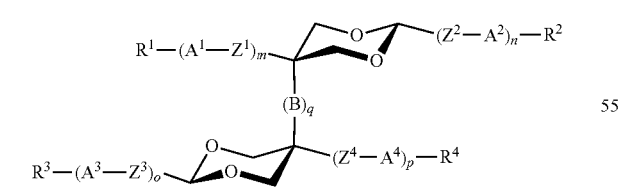

Ic

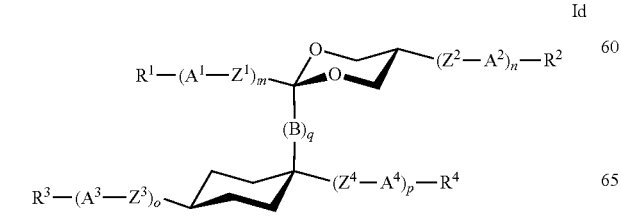

Id

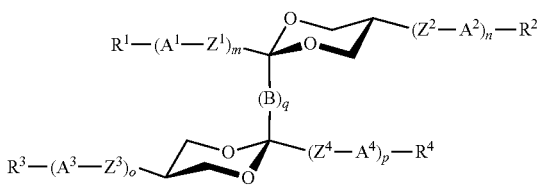

Ie

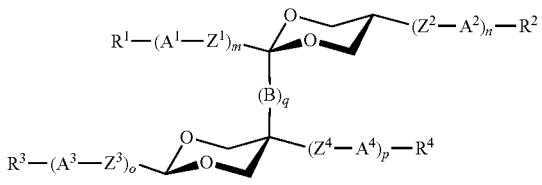

If

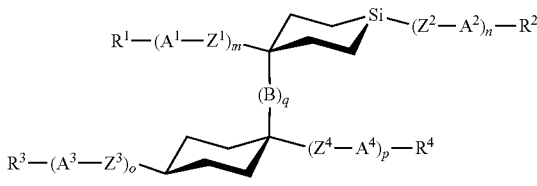

Ig

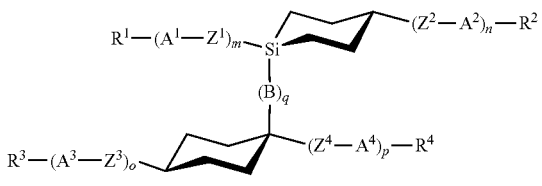

Ih

Ii

Ik

Im

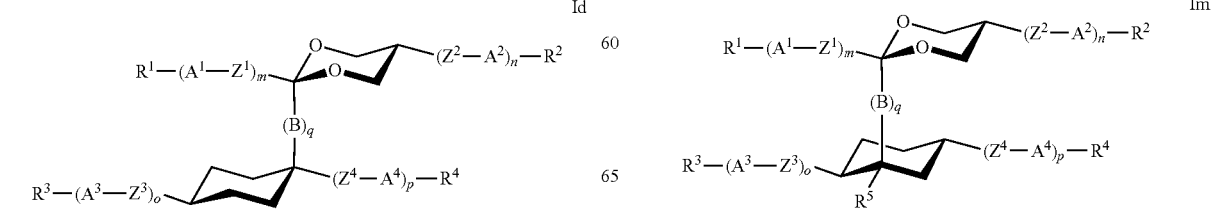

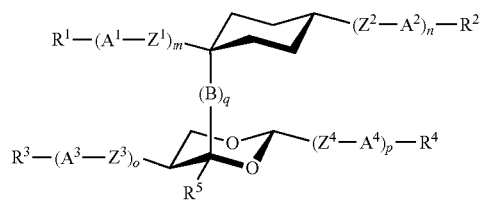 In
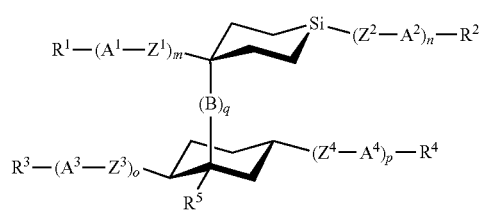 Io
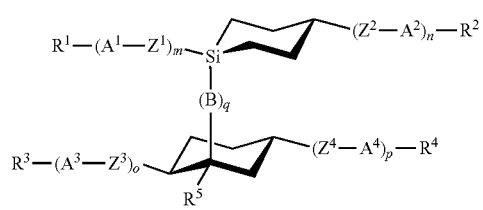 Ip
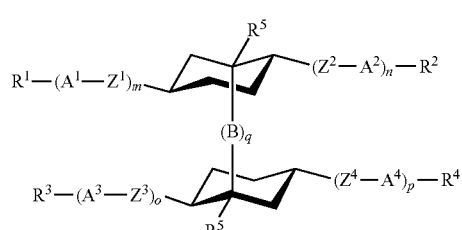 Iq
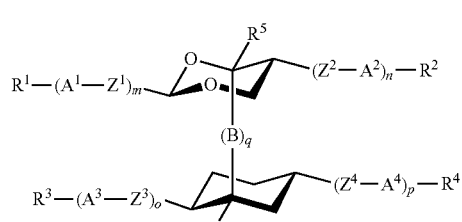 Ir
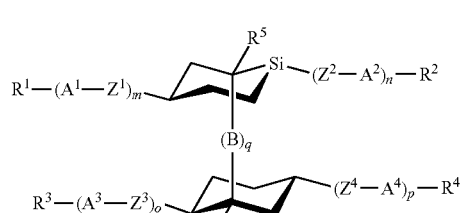 Is
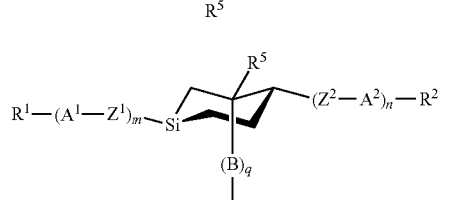 It
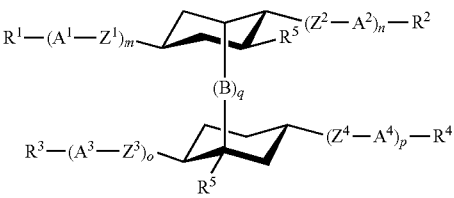 Iu
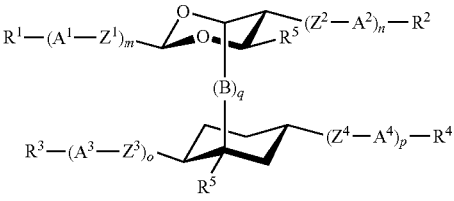 Iv
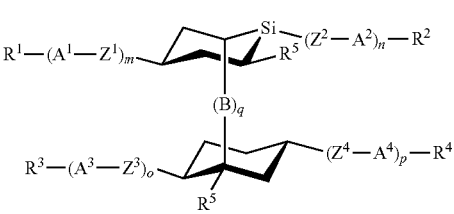 Iw
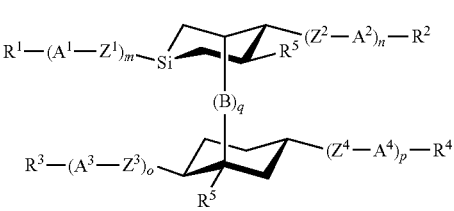 Ix
wherein $R^{1-5}$, $A^{1-4}$, $Z^{1-4}$, B, m, n, o, p and q have one the meanings given above.
Especially preferred are compounds of the following sub formulae:

I1 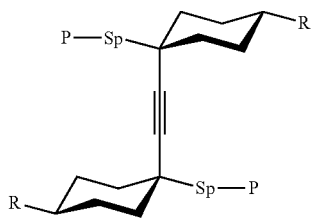 I2 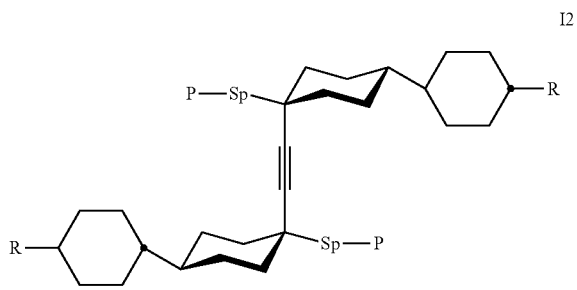
I3 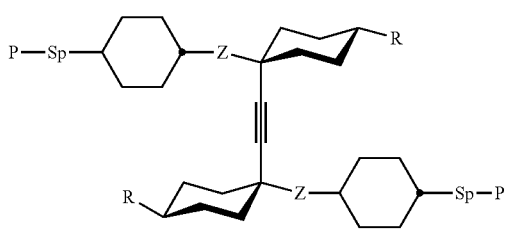 I4 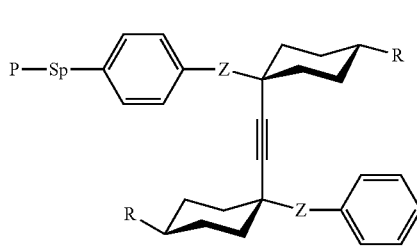
I5 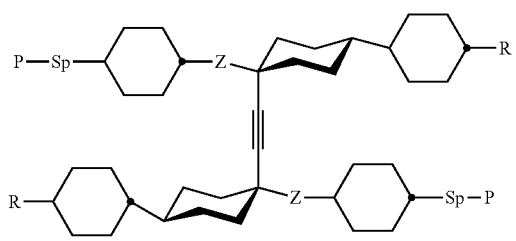 I6 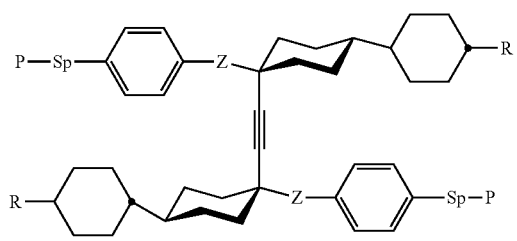
I7 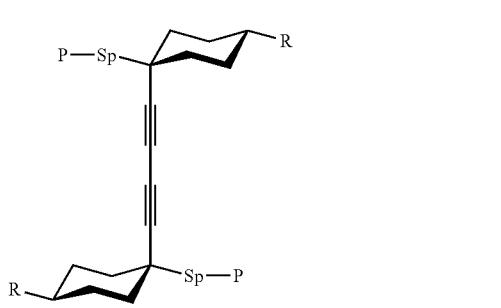 I8 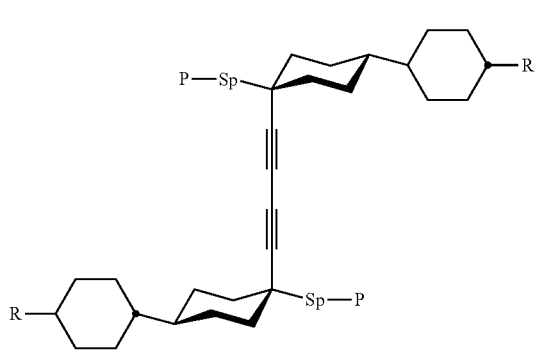
I9 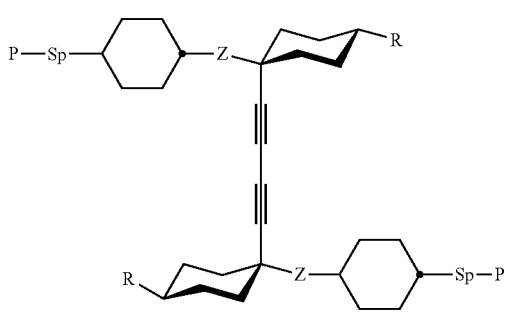 I10 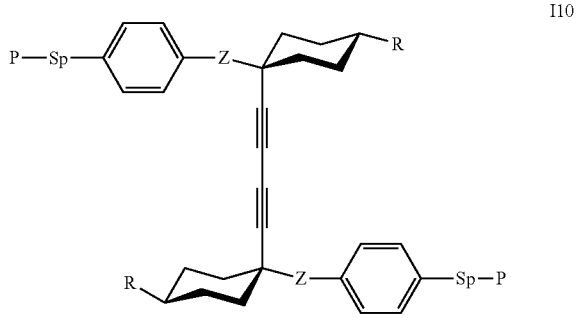

I11
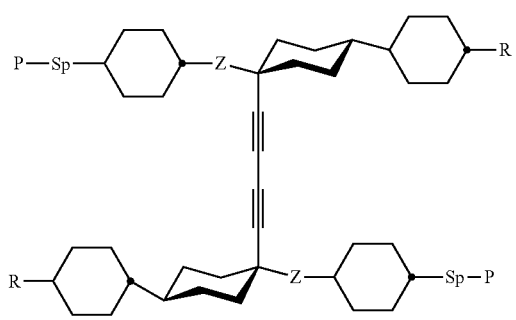
I12
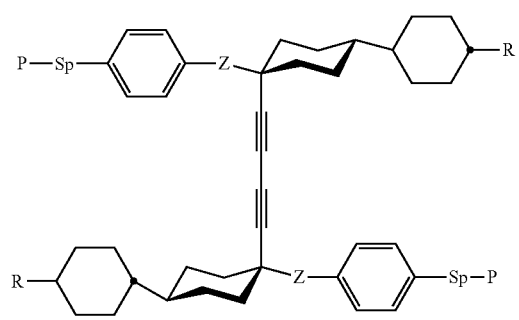
I13
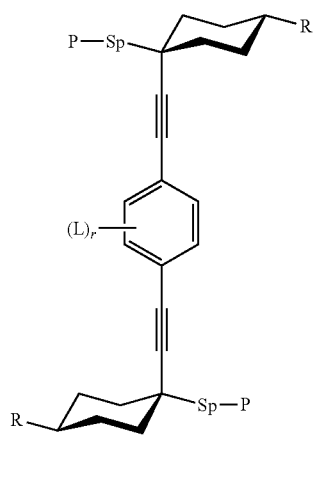
I14
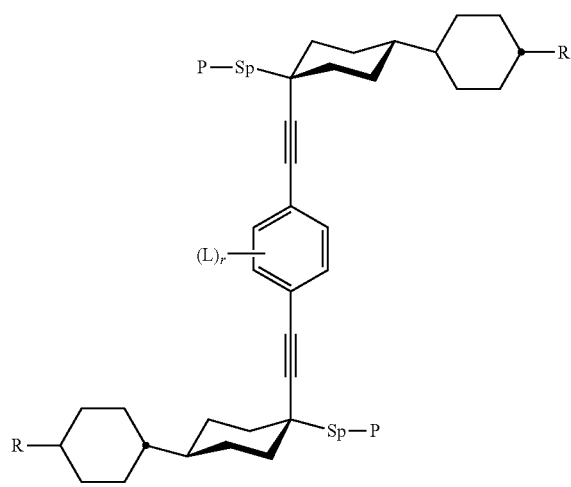
I15
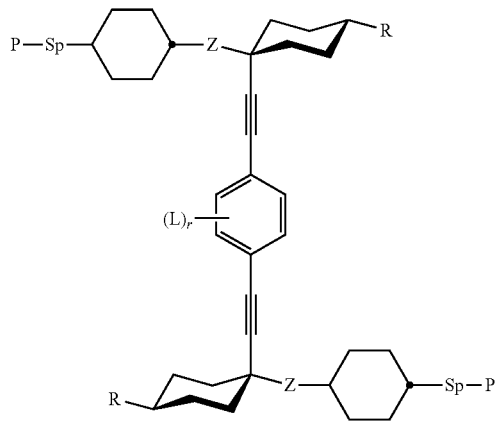
I16
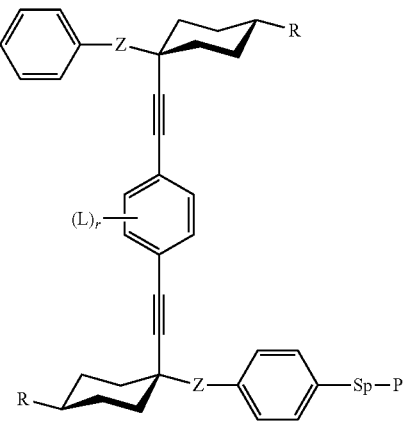

-continued
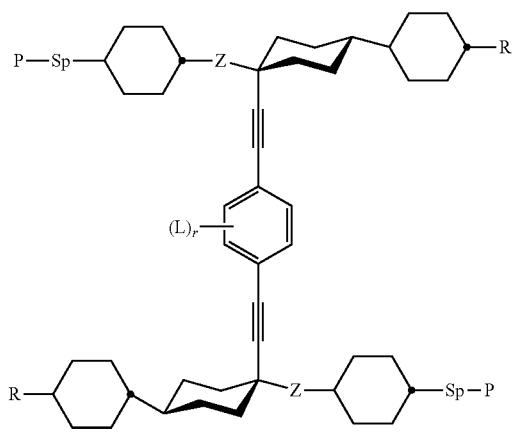
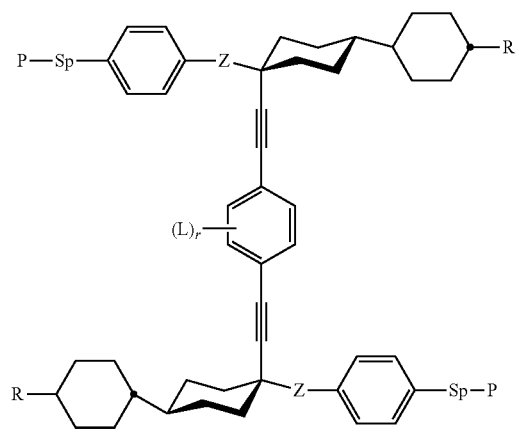
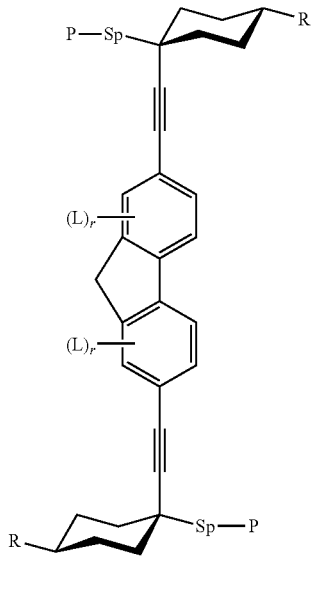
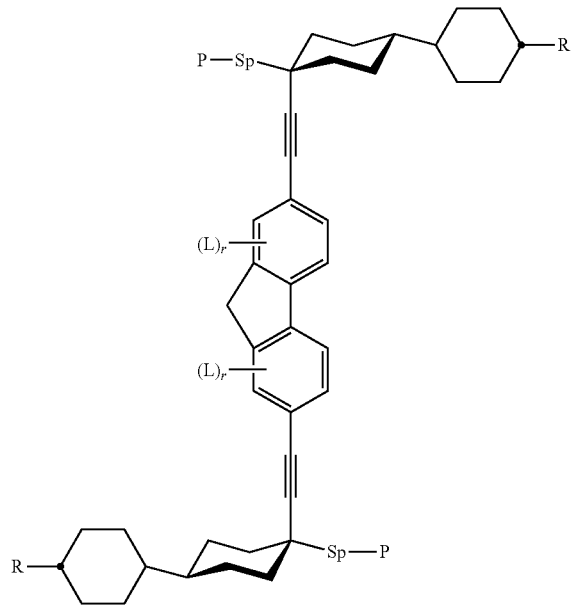
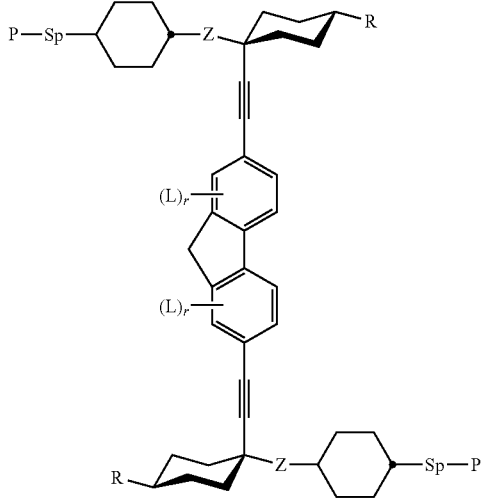
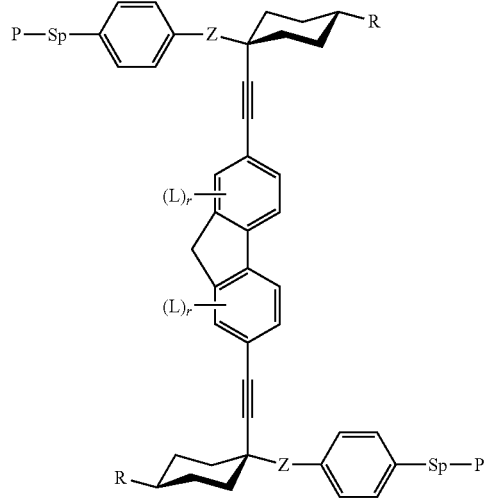

I23
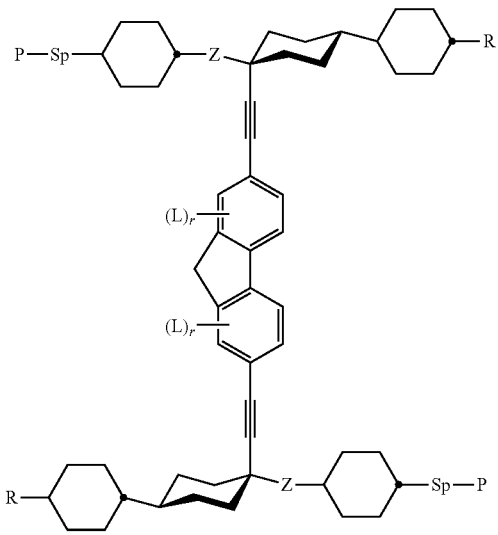
I24
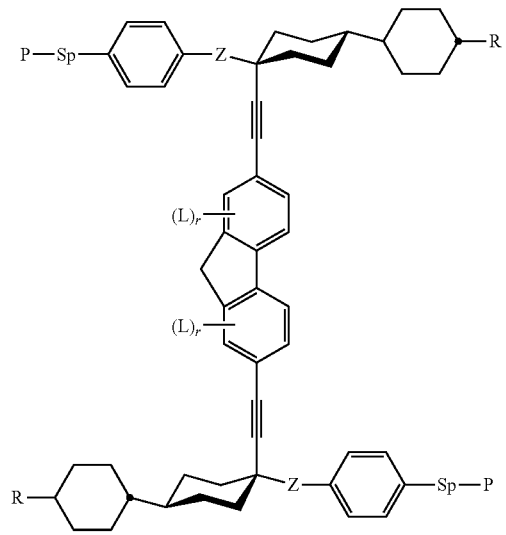
I25
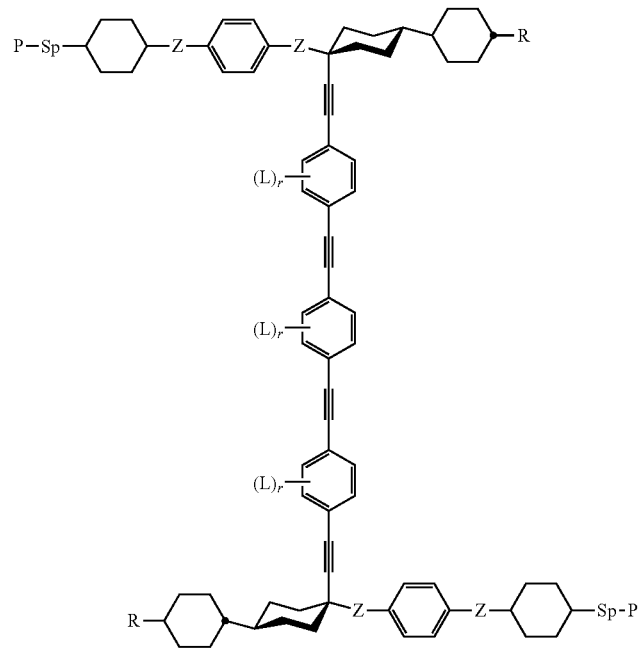

-continued

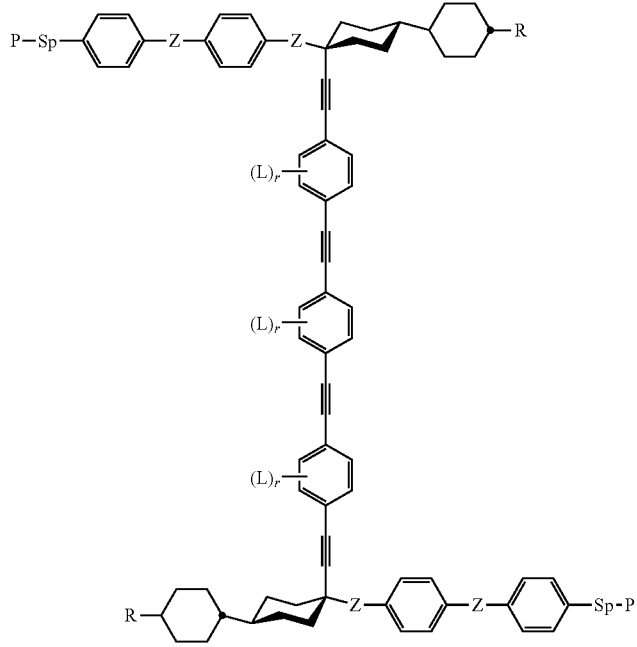

I26 wherein Z has one of the meanings of $Z^1$ given above, R has one of the meanings of $R^1$ as given above that is different from P-Sp-, and P, Sp, L and r are as defined above, and the benzene rings in the mesogenic groups are optionally substituted by one or more groups L as defined above.

Preference is furthermore given to a polymerisable liquid crystalline medium wherein the compounds of formula I are selected from the group of compounds of formula I 25 or I 26, in particular wherein Z denotes —COO—, r is in each occurrence 0, and P, Sp are as defined above.

P-Sp- in these preferred compounds is preferably P-Sp'-X', with X' preferably being —O—, —COO— or —OCOO—.

The compounds of formula I and suitable methods for their synthesis are disclosed in WO 2008/119427 A1.

Additionally, further polymerisable compounds can be added to the polymerisable LC material in accordance with the present invention. These compounds are preferably mesogenic or liquid crystalline. More preferably the LC material comprises one or more additional compounds selected from reactive mesogens (RMs), most preferably selected from mono- and direactive RMs.

The additional RMs can be prepared by methods which are known per se and which are described in standard works of organic chemistry like for example Houben-Weyl, Methoden der organischen Chemie, Thieme-Verlag, Stuttgart. Suitable RMs are disclosed for example in WO 93/22397, EP 0 261 712, DE 195 04 224, WO 95/22586, WO 97/00600, U.S. Pat. Nos. 5,518,652, 5,750,051, 5,770,107 and 6,514,578. Examples of particularly suitable and preferred RMs are shown in the following list.

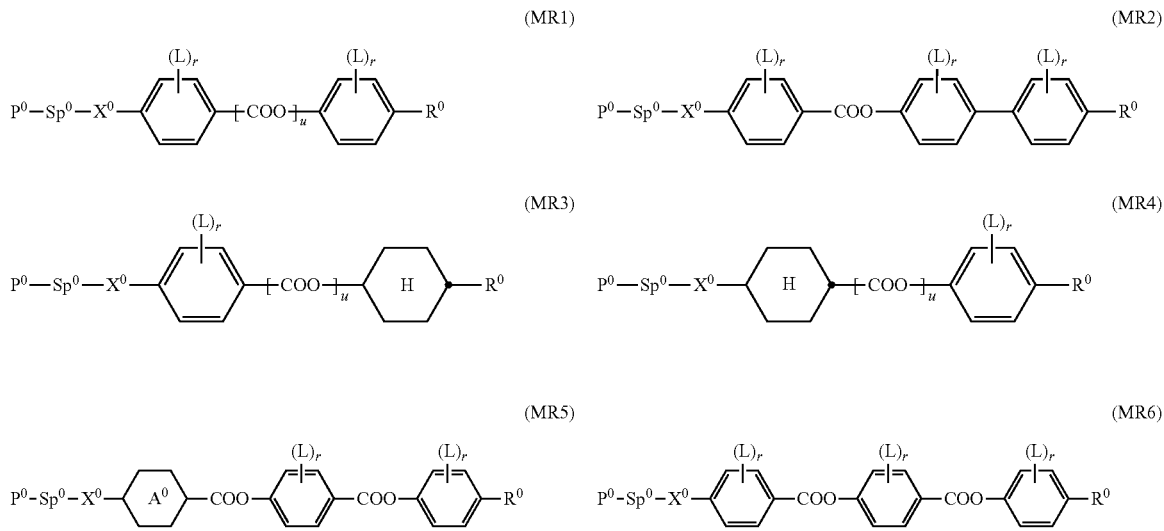

-continued
(MR7)
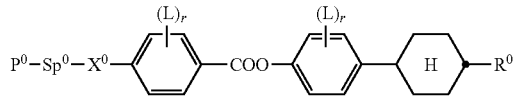
(MR8)
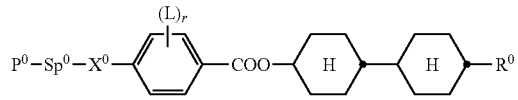
(MR9)
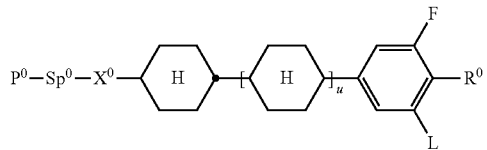
(MR10)
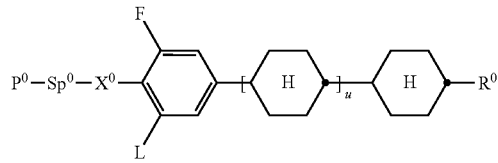
(MR11)
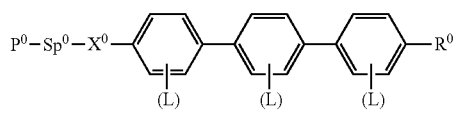
(MR12)
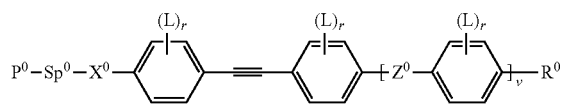
(MR13)
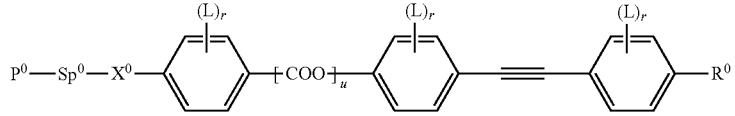
(MR14)
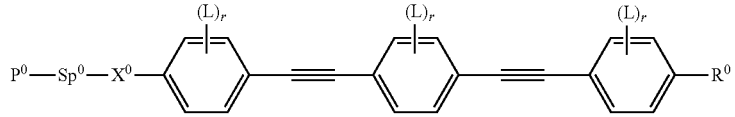
(MR15)
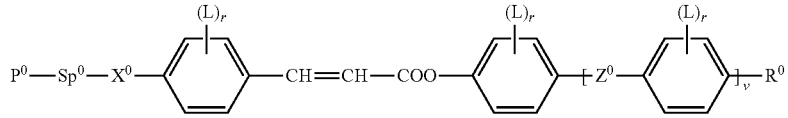
(MR16)
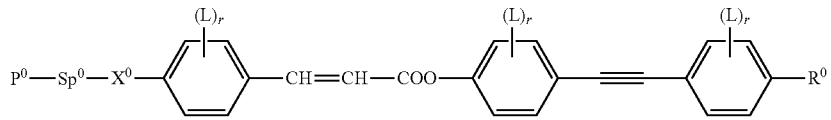
(MR17)
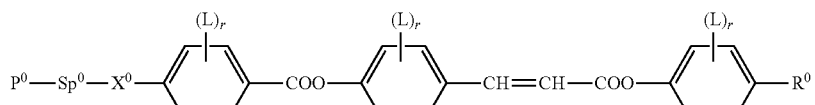
(MR18)
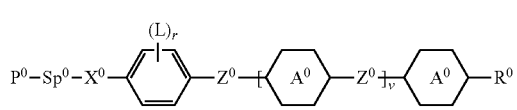
(MR19)
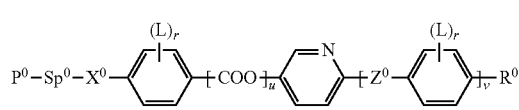
(MR20)
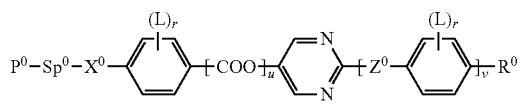
(MR21)
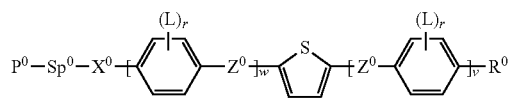
(MR22)
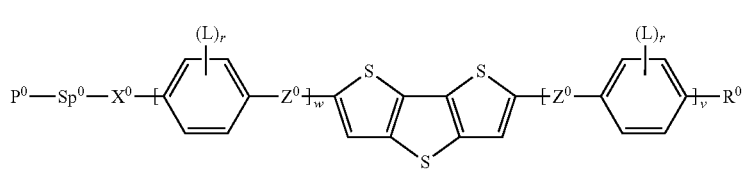

(MR23)
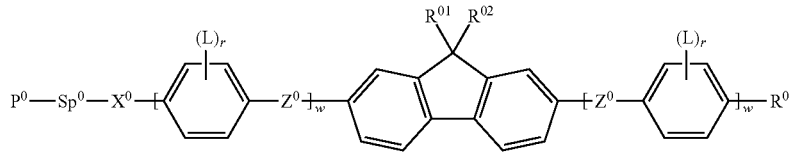
(MR24)
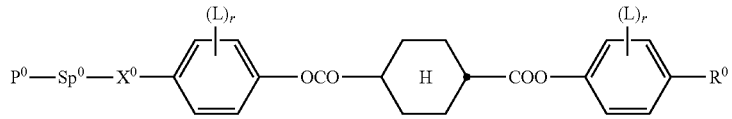
(MR25)
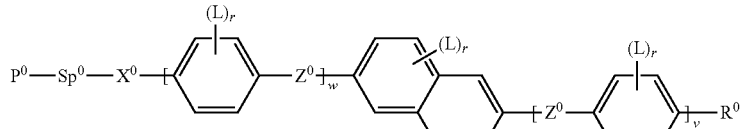
(MR26)
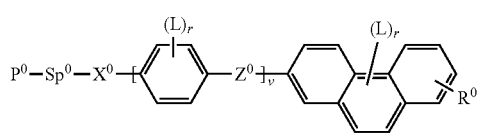
(MR27)
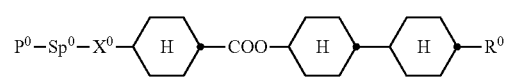
(MR28)
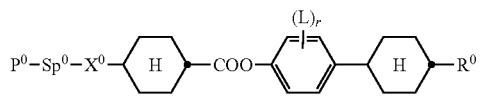
(MR29)
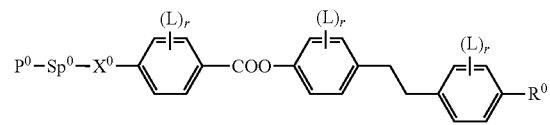
(MR30)
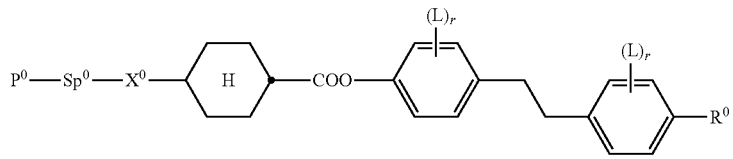
(DR1)
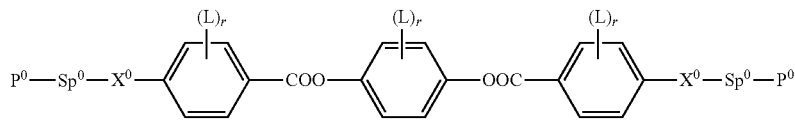
(DR2)
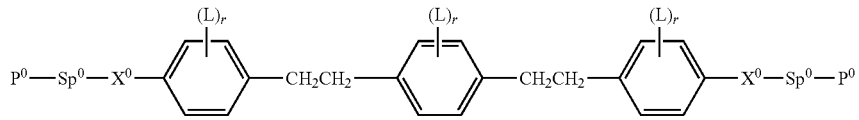
(DR3)
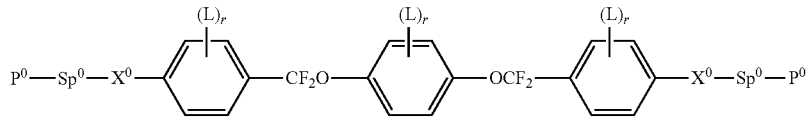
(DR4)
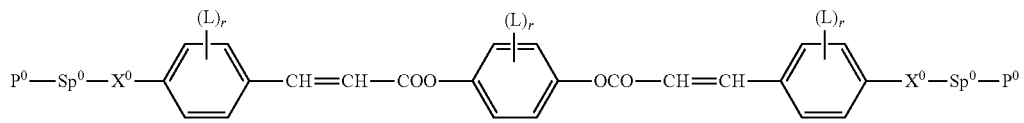
(DR5)
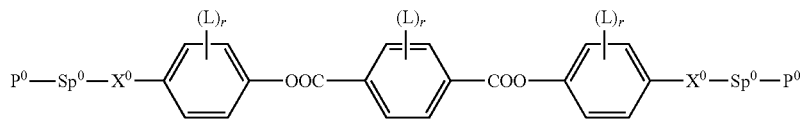

-continued
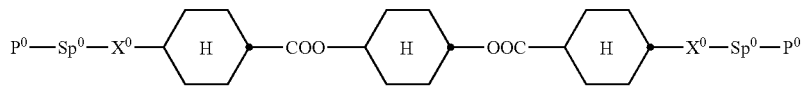 (DR6)
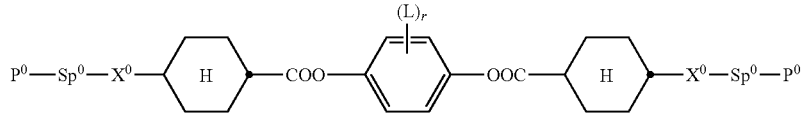 (DR7)
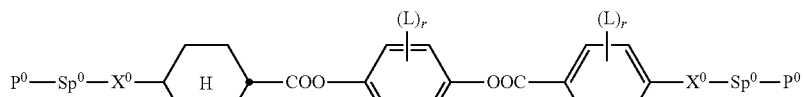 (DR8)
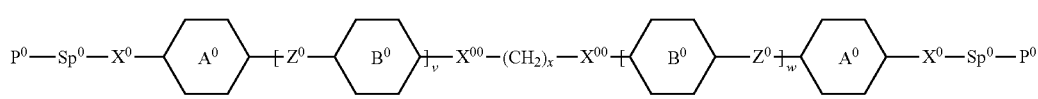 (DR9)
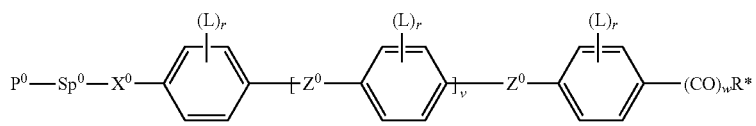 (CR1)
(CR2)
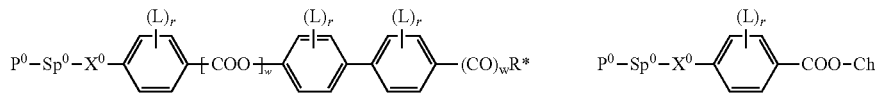 (CR3)
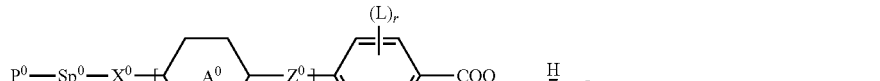 (CR4)
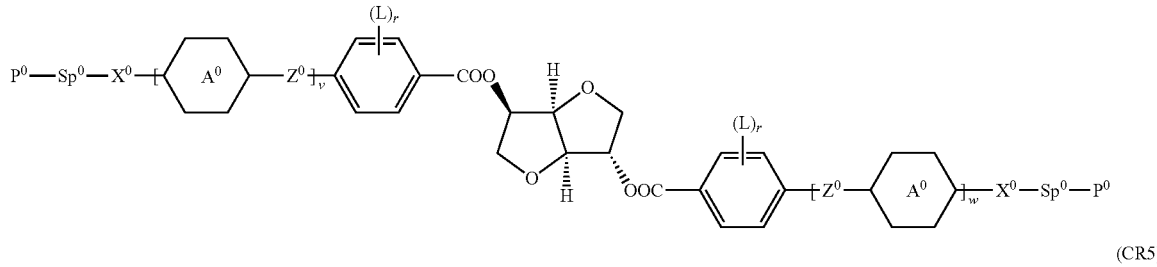 (CR5)
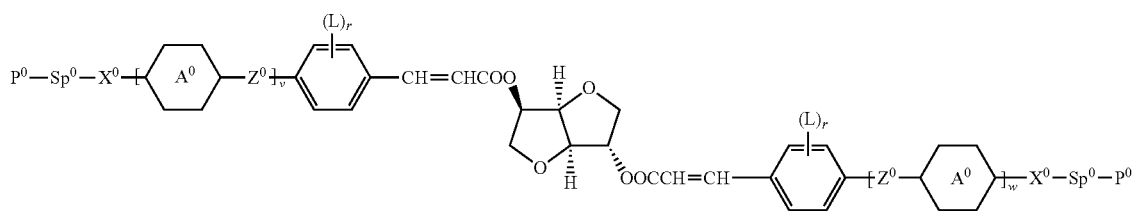 (CR6)
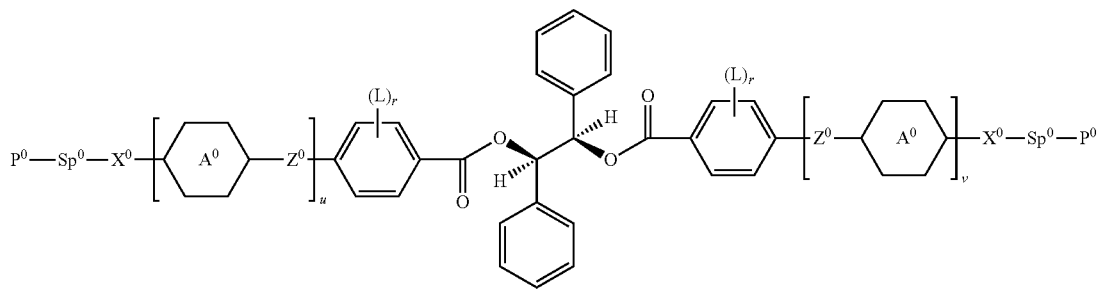

(CR7)

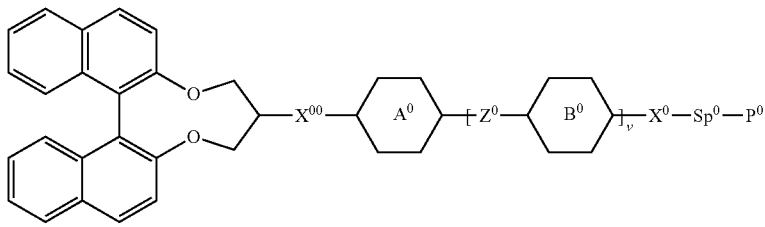

wherein

P⁰ is, in case of multiple occurrence independently of one another, a polymerisable group having one of the meanings given for P above, and is preferably an acryl, methacryl, oxetane, 3-ethyloxetane, epoxy, vinyloxy or styrene group, Sp⁰ is a spacer group having one of the meanings given for Sp' above, X⁰ has one of the meanings given for X' above, Sp⁰-X⁰ is preferably selected from —(CH$_2$)$_{p1}$—, —(CH$_2$)$_{p1}$—O—, —(CH$_2$)$_{p1}$—CO—O— and —(CH$_2$)$_{p1}$—O—CO—O—, wherein p1 is an integer from 1 to 12 and wherein these groups are linked to an adjacent ring via the O-atom if present, A⁰ and B⁰ are, in case of multiple occurrence independently of one another, 1,4-phenylene that is optionally substituted with 1, 2, 3 or 4 groups L, or trans-1,4-cyclohexylene, Z⁰ is, in case of multiple occurrence independently of one another, —COO—, —OCO—, —CH$_2$CH$_2$—, —C≡C—, —CH=CH—, —CH=CH—COO—, —OCO—CH=CH— or a single bond, R⁰ is alkyl, alkoxy, thioalkyl, alkylcarbonyl, alkoxycarbonyl, alkylcarbonyloxy or alkoxycarbonyloxy with 1 to 20, preferably 1 to 15 C atoms which is optionally fluorinated, or denotes Y⁰ or P-Sp⁰-X⁰—, Y⁰ is F, Cl, CN, NO$_2$, OCH$_3$, OCN, SCN, SF$_5$, optionally fluorinated alkylcarbonyl, alkoxycarbonyl, alkylcarbonyloxy or alkoxycarbonyloxy with 1 to 4 C atoms, or mono-oligo- or polyfluorinated alkyl or alkoxy with 1 to 4 C atoms, X⁰⁰ is —O—, —S—, —CO—, —COO—, —OCO—, —O—COO—, —CO—NR⁰¹—, —NR⁰¹—CO—, —NR⁰¹—CO—NR⁰¹—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR⁰¹—, —CF=CF—, —C≡C—, —CH=CH—COO—, —OCO—CH=CH— or a single bond, R⁰¹ is H or alkyl with 1 to 12 C-atoms, R* is a chiral alkyl or alkoxy group with 4 or more, preferably 4 to 12 C atoms, like 2-methylbutyl, 2-methyloctyl, 2-methylbutoxy or 2-methyloctoxy, Ch is a chiral group selected from cholesteryl, estradiol, or terpenoid radicals like menthyl or citronellyl, L is, in case of multiple occurrence identically or differently F, Cl, CN, SCN, SF$_5$ or straight-chain or branched, optionally mono- or polyfluorinated alkyl, alkoxy, alkenyl, alkynyl, alkylcarbonyl, alkoxycarbonyl, or alkylcarbonyloxy or alkoxycarbonyloxy having 1 to 12 C atoms, (wherein the groups different from alkyl and alkoxy contain at least 2 C atoms and branched groups contain at least 3 C atoms) or optionally halogenated alkyl, alkoxy, alkylcarbonyl, alkoxycarbonyl, alkylcarbonyloxy or alkoxycarbonyloxy with 1 to 5 C atoms, r is 0, 1, 2, 3 or 4, u is 0 or 1, v and v are independently of each other 0, 1 or 2, and wherein the benzene and napthalene rings can additionally be substituted with one or more identical or different groups L.

Especially preferably the polymerisable LC host component contains only achiral compounds and no chiral compounds.

Further preferably the polymerisable LC host component comprises one or more compounds selected from the group consisting of formulae MR3, MR4, MR7, MR8, MR9, MR10, MR18, MR27, MR28, DR1, DR5, DR6, DR7, DR8, and DR9.

Further preferably the polymerisable LC host component comprises one or more compounds selected from the following formulae:

(DR1a)

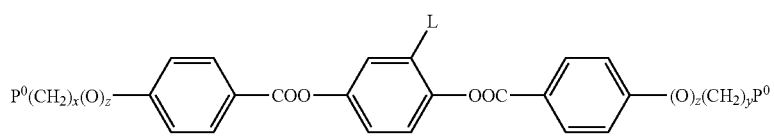

(DR2a)

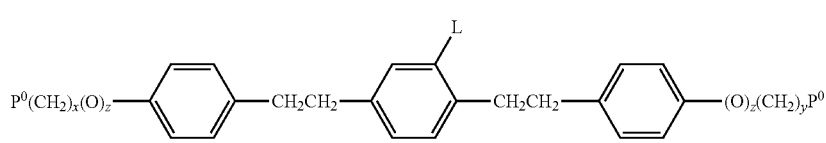

(DR6a)

-continued
(DR7a)
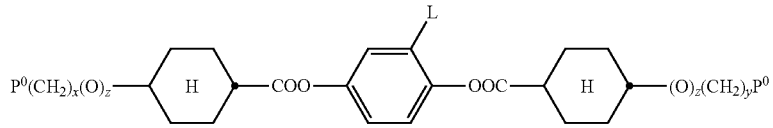
(DR8a)
(DR9a)
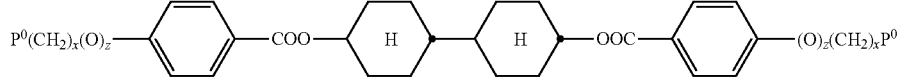
(DR9b)
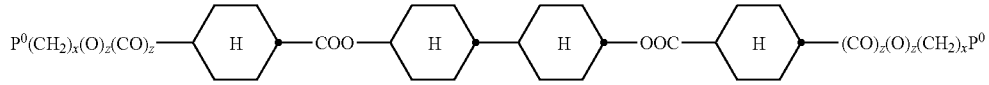
(DR9c)
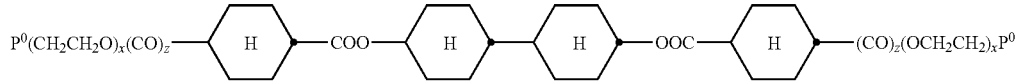
(DR9d)
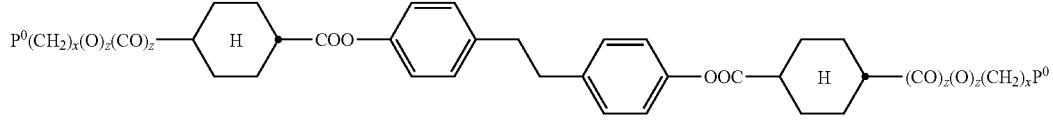
(DR9e)
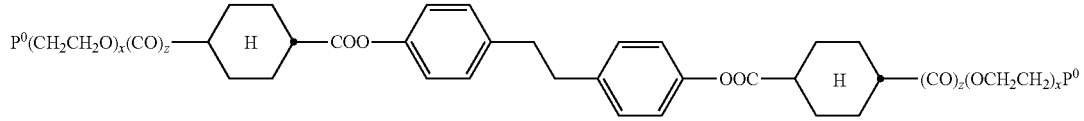
(MR3a)
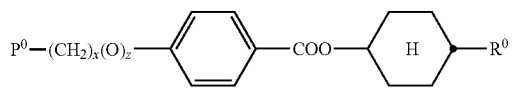
(MR3b)
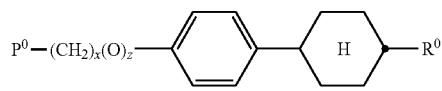
(MR4a)
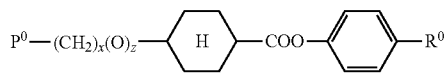
(MR7a)
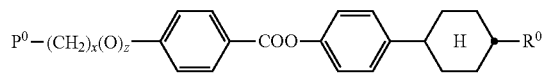
(MR8a)
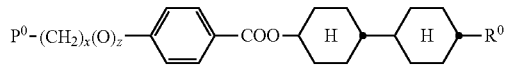
(MR9a)
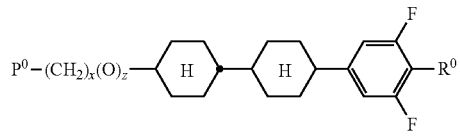
(MR10a)
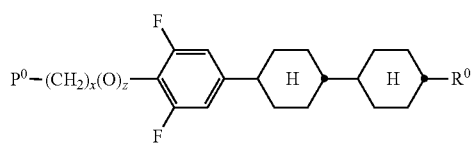
(MR27a)
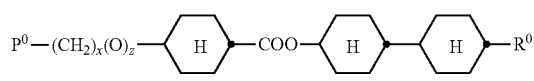
(MR28a)
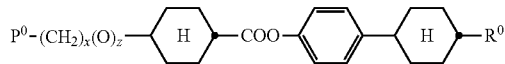
(MR29a)
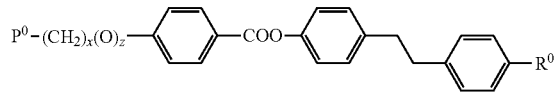

(MR30a)

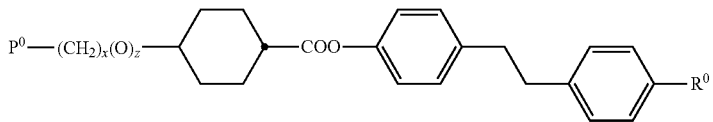

wherein P⁰ and R⁰ are as defined above, R⁰ is preferably alkyl, alkoxy or alkylcarbonyloxy with 1 to 6 C-atoms, L is H or CH₃, x and y are independently of each other 0 or identical or different integers from 1 to 12, z is on each occurrence independently of one another 0 or 1, with z being 0 if the adjacent x or y is 0.

Further preferably the polymerisable LC host component comprises one or more compounds selected from the following formulae:

(MR3a1)

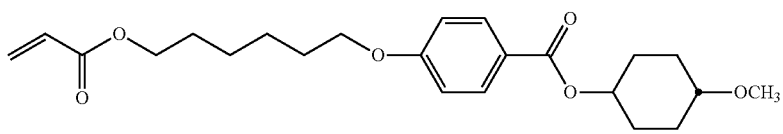

(MR3a2)

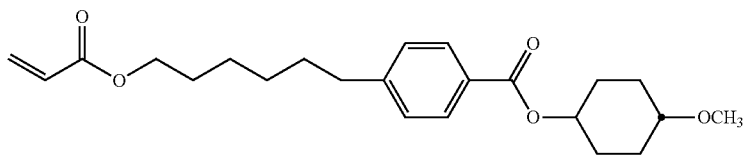

(MR3b1)

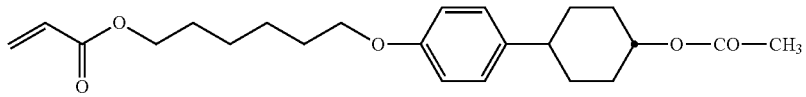

(MR4a1)

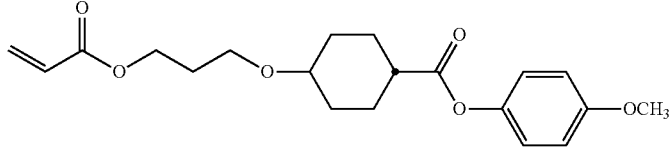

(MR4a2)

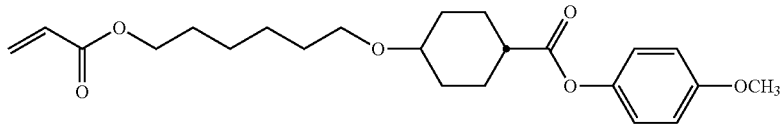

(MR4a3)

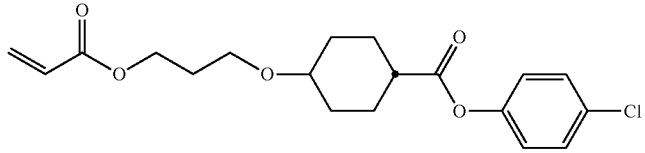

(MR4a4)

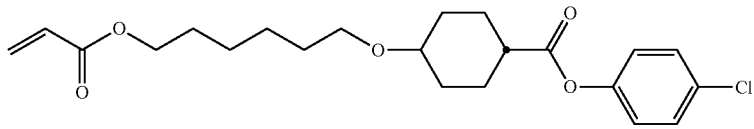

(MR7a1)

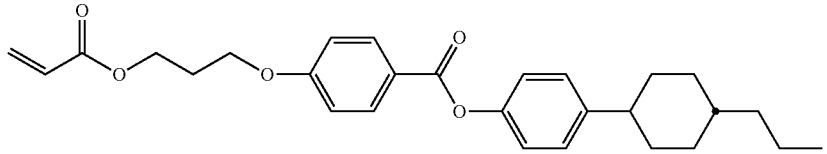

-continued
(MR7a2)
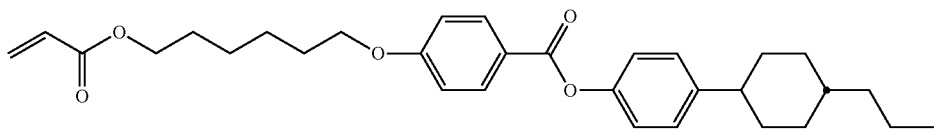
(MR7a3)
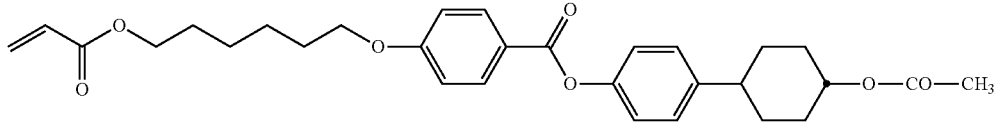
(MR8a1)
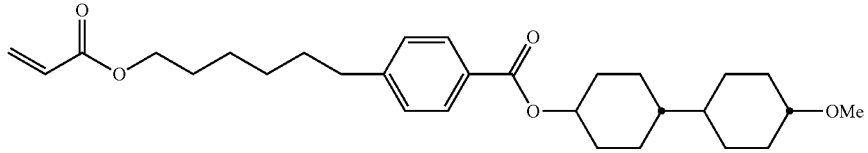
(MR8a2)
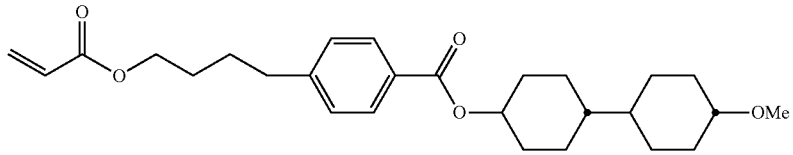
(MR8a3)
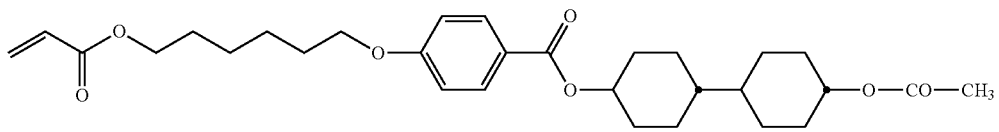
(MR9a1)
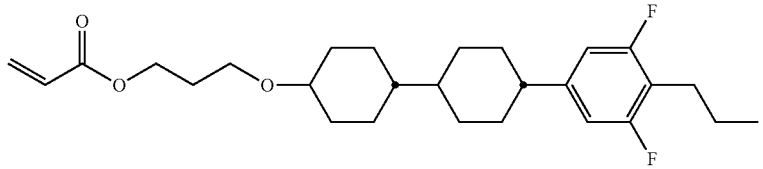
(MR9a2)
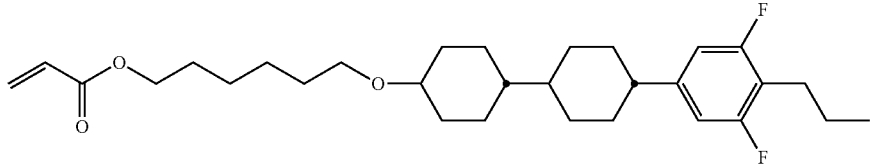
(MR10a1)
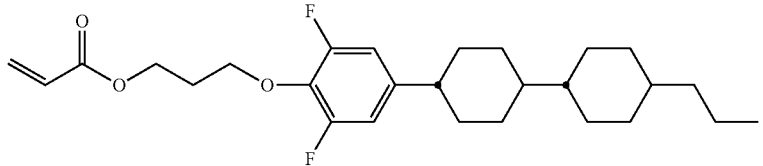
(MR10a2)
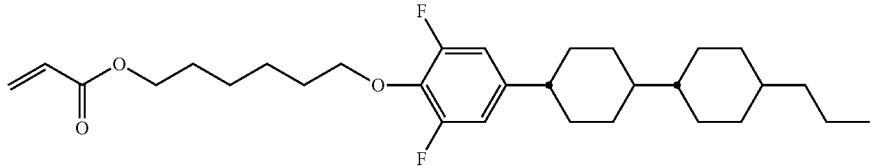

-continued
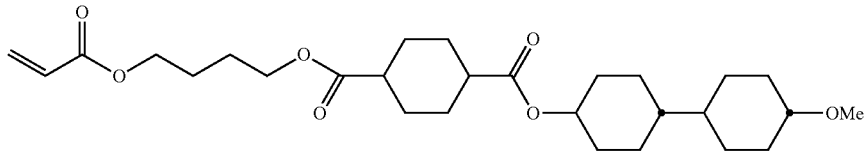
(MR27a1)
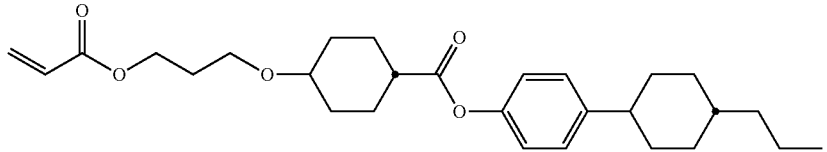
(MR28a1)
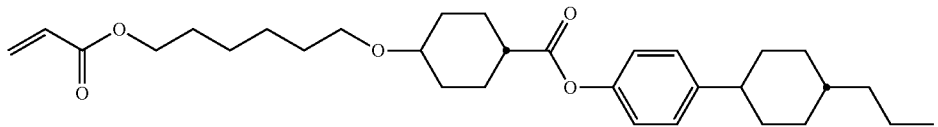
(MR28a2)
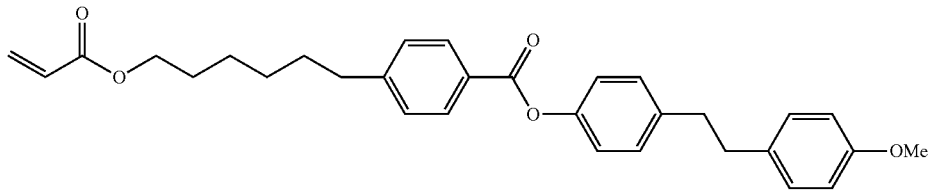
(MR29a1)
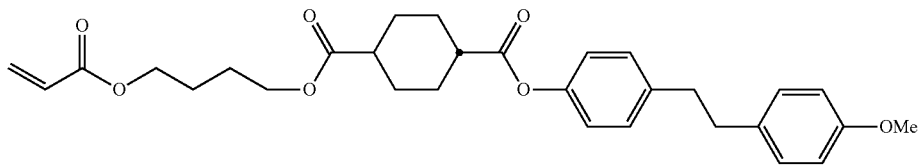
(MR30a1)
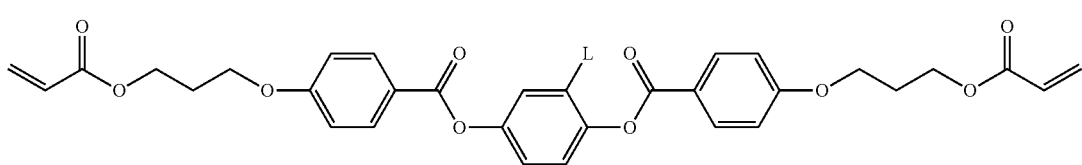
(DR1a1)
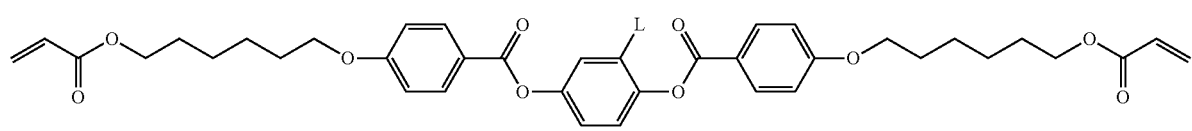
(DR1a2)
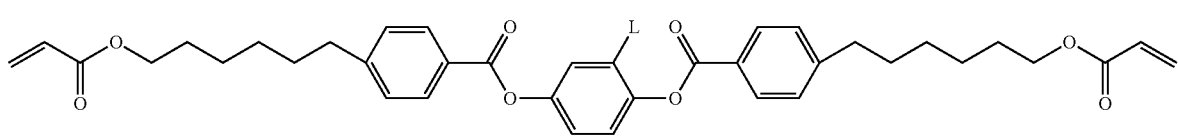
(DR1a3)
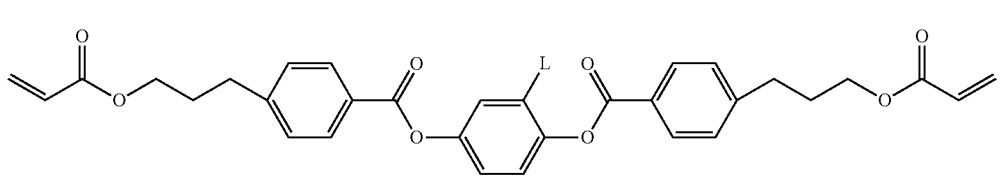
(DR1a4)

(DR1a5)
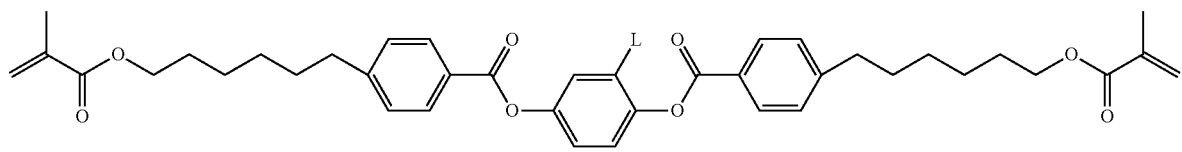
(DR2a1)
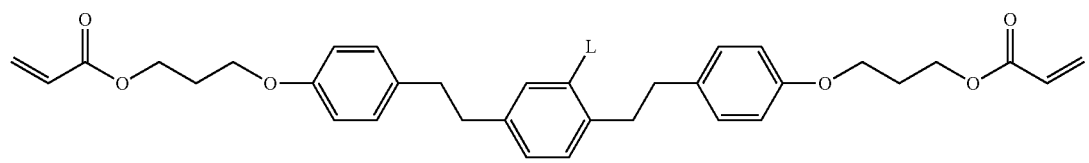
(DR6a)
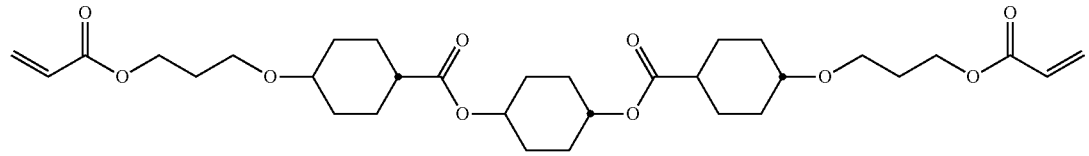
(DR6b)
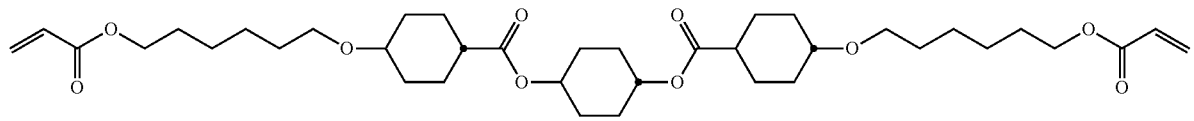
(DR7a1)
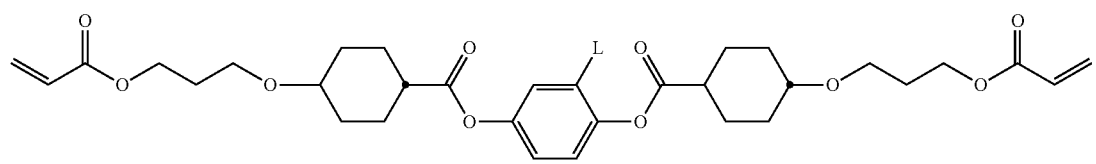
(DR7a2)
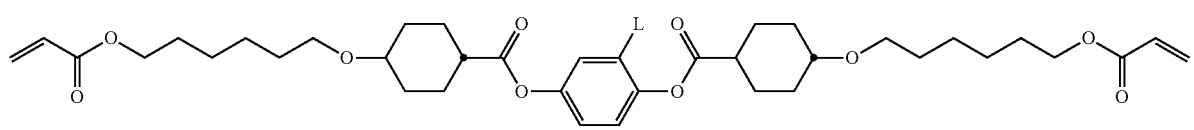
(DR8a1)
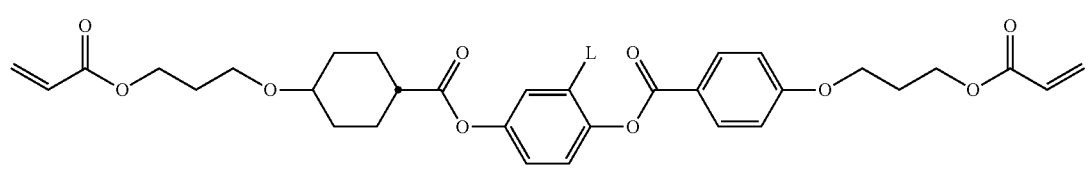
(DR8a2)
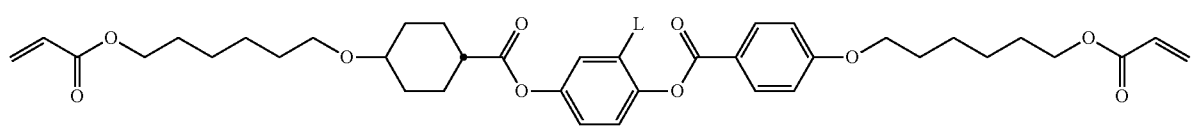
(DR9a1)
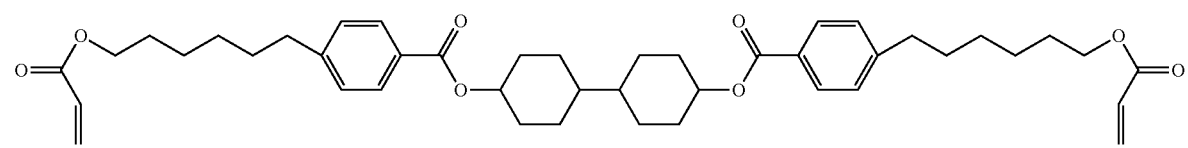

(DR9a2)
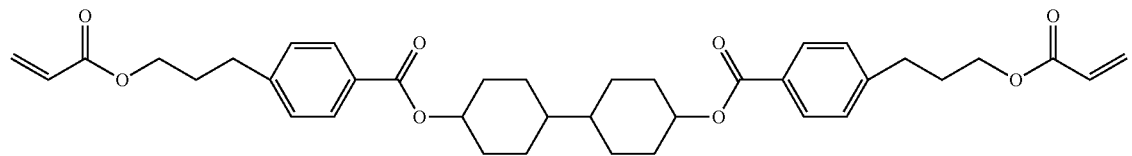

(DR9a3)
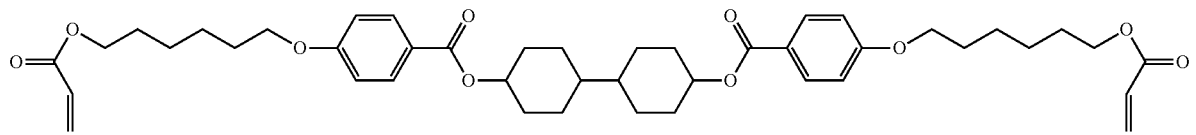

(DR9b1)
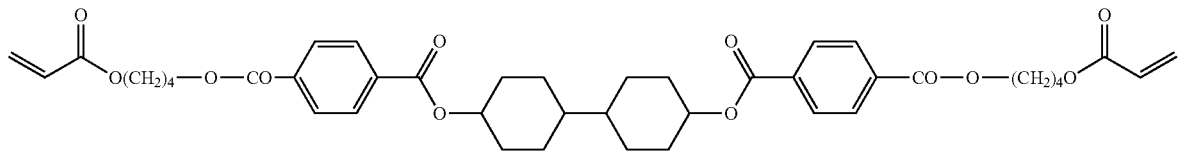

(DR9c1)
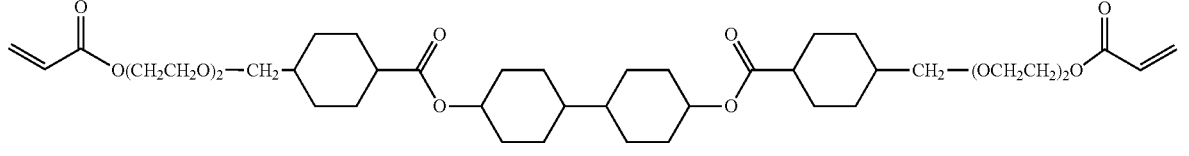

(DR9d1)
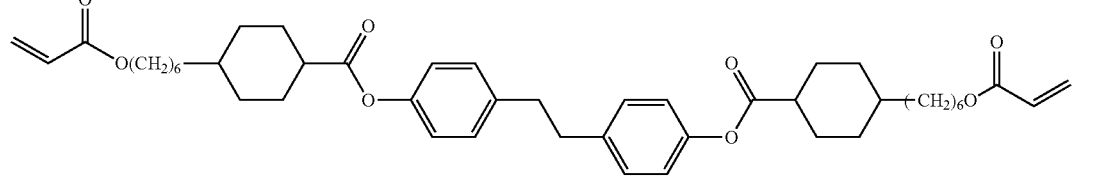

(DR9d2)
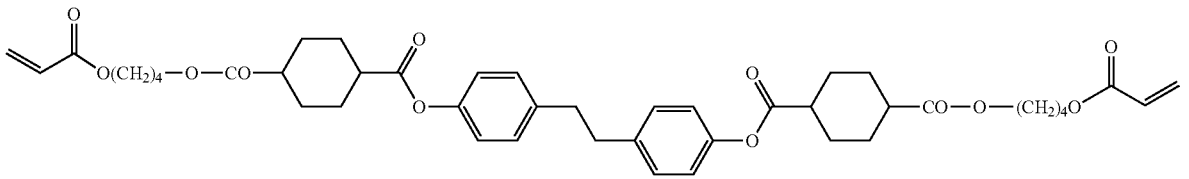

(DR9e1)
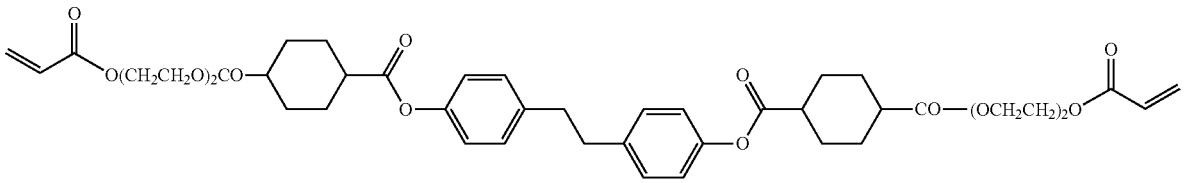

wherein L is H or CH$_3$.

The aforementioned RMs and their synthesis are known from prior art. For example, compounds DR1a1 and DR1a2 are described in D. J. Broer; G. Challa; G. N. Mol, *Macromol. Chem*, 1991, 192, 59, compounds MR10a1 and MR10a2 are described in U.S. Pat. No. 6,183,822, and compounds MR7a1 and MR7a2 are described in U.S. Pat. No. 5,720,900.

Preferably the polymerisable compounds of the polymerisable material are selected from mono- or direactive RMs, preferably having low birefringence.

Especially preferred is a polymerisable material having an absolute value of the birefringence from 0.01 to 0.2, very preferably from 0.04 to 0.16.

The general preparation of polymer LC films according to this invention is known to the ordinary expert and described in the literature, for example in D. J. Broer; G. Challa; G. N. Mol, *Macromol. Chem*, 1991, 192, 59. Typically a polymerisable LC material is coated or otherwise applied onto a substrate where it aligns into uniform orientation, and polymerised in situ in its LC phase at a selected temperature for example by exposure to heat or actinic radiation, preferably by photo-polymerisation, very preferably by UV-photopolymerisation, to fix the alignment of the LC molecules. If necessary, uniform alignment can be promoted by additional means like shearing or annealing the LC material, surface treatment of the substrate, or adding surfactants to the LC material.

As substrate for example glass or quartz sheets or plastic films can be used. It is also possible to put a second substrate on top of the coated material prior to and/or during and/or after polymerisation. The substrates can be removed after polymerisation or not. When using two substrates in case of curing by actinic radiation, at least one substrate has to be transmissive for the actinic radiation used for the polymerisation. Isotropic or birefringent substrates can be used. In case the substrate is not removed from the polymerised film after polymerisation, preferably isotropic substrates are used.

Suitable and preferred plastic substrates are for example films of polyester such as polyethyleneterephthalate (PET) or polyethylene-naphthalate (PEN), polyvinylalcohol (PVA), polycarbonate (PC) or triacetylcellulose (TAC), very preferably PET or TAC films. As birefringent substrates for example uniaxially stretched plastics film can be used. PET films are commercially available for example from DuPont Teijin Films under the trade name Melinex®.

The polymerisable material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerisable material in a suitable solvent. This solution is then coated or printed onto the substrate, for example by spin-coating or printing or other known techniques, and the solvent is evaporated off before polymerisation. In many cases it is suitable to heat the mixture in order to facilitate the evaporation of the solvent. As solvents for example standard organic solvents can be used. The solvents can be selected for example from ketones such as acetone, methyl ethyl ketone, methyl propyl ketone or cyclohexanone; acetates such as methyl, ethyl or butyl acetate or methyl acetoacetate; alcohols such as methanol, ethanol or isopropyl alcohol; aromatic solvents such as toluene or xylene; halogenated hydrocarbons such as di- or trichloromethane; glycols or their esters such as PGMEA (propyl glycol monomethyl ether acetate), γ-butyrolactone, and the like. It is also possible to use binary, ternary or higher mixtures of the above solvents.

Uniform alignment of the polymerisable LC material, for example planar alignment (for preparing A plates) or homeotropic, i.e. perpendicular alignment (for preparing C plates) can be achieved for example by rubbing treatment of the substrate, by shearing the material during or after coating, by annealing the material before polymerisation, by application of an alignment layer, by applying a magnetic or electric field to the coated material, or by the addition of surface-active compounds to the material. Reviews of alignment techniques are given for example by I. Sage in "Thermotropic Liquid Crystals", edited by G. W. Gray, John Wiley & Sons, 1987, pages 75-77; and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Especially preferred is a polymerisable material comprising one or more surfactants that promote a specific surface alignment of the LC molecules. Suitable surfactants are described for example in J. Cognard, Mol. Cryst. Liq. Cryst. 78, Supplement 1, 1-77 (1981). Preferred aligning agents for planar alignment are for example non-ionic surfactants, preferably fluoro-carbon surfactants such as the commercially available Fluorad FC-171® (from 3M Co.), Tego Twin 4100 ® (from Evonik), or Zonyl FSN® (from DuPont), multiblock surfactants as described in GB 2 383 040 or polymerisable surfactants as described in EP 1 256 617. Preferably the total concentration of surfactants in the polymerisable LC material is from 0.05 to 3%, very preferably from 0.1 to 1%.

It is also possible to apply an alignment layer onto the substrate and provide the polymerisable material onto this alignment layer. Suitable alignment layers are known in the art, like for example rubbed polyimide or alignment layers prepared by photoalignment as described in U.S. Pat. Nos. 5,602,661, 5,389,698 or 6,717,644.

Rubbed polyimide (PI) can for example be used to induce planar alignment, whereas an untreated glass substrate can for example be used to induce homeotropic alignment.

It is also possible to induce or improve alignment by annealing the polymerisable LC material at elevated temperature, preferably at its polymerisation temperature, prior to polymerisation.

Polymerisation is achieved for example by exposing the polymerisable material to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation. As a source for actinic radiation for example a single UV lamp or a set of UV lamps can be used. When using a high lamp power the curing time can be reduced. Another possible source for actinic radiation is a laser, like for example a UV, IR or visible laser.

Polymerisation is preferably carried out in the presence of an initiator absorbing at the wavelength of the actinic radiation. For this purpose the polymerisable LC material preferably comprises one or more initiators, preferably in a concentration from 0.01 to 10%, very preferably from 0.05 to 5%. For example, when polymerising by means of UV light, a photoinitiator can be used that decomposes under UV irradiation to produce free radicals or ions that start the polymerisation reaction. For polymerising acrylate or methacrylate groups preferably a radical photoinitiator is used. For polymerising vinyl, epoxide or oxetane groups preferably a cationic photoinitiator is used. It is also possible to use a thermal polymerisation initiator that decomposes when heated to produce free radicals or ions that start the polymerisation. Typical radical photoinitiators are for example the commercially available Irgacure® or Darocure® (Ciba AG, Basel, Switzerland). A typical cationic photoinitiator is for example UVI 6974 (Union Carbide).

The polymerisable material may also comprise one or more stabilizers or inhibitors to prevent undesired spontaneous polymerisation, like for example the commercially available Irganox® (Ciba AG, Basel, Switzerland), preferably in a concentration of from 0.005 to 1%, very preferably from 0.01 to 0.2%.

The curing time depends, inter alia, on the reactivity of the polymerisable material, the thickness of the coated layer, the type of polymerisation initiator and the power of the UV lamp. The curing time is preferably <5 minutes, very preferably <3 minutes, most preferably <1 minute. For mass production short curing times of <30 seconds are preferred.

A suitable UV radiation power is preferably in the range from 5 to 200 mWcm$^{-2}$, more preferably in the range from 10 to 175 mWcm$^{-2}$ and most preferably in the range from 15 to 150 mWcm$^{-2}$.

In connection with the applied UV radiation and as a function of time, a suitable UV dose is preferably in the range from 25 to 7200 mJcm$^{-2}$ more preferably in the range from 500 to 7200 mJcm$^{-2}$ and most preferably in the range from 3000 to 7200 mJcm$^{-2}$.

Preferably polymerisation is carried out in an inert gas atmosphere like nitrogen or argon.

The polymerisable material may also comprise one or more dyes having an absorption maximum adjusted to the wavelength of the radiation used for polymerisation, in particular UV dyes like e.g. 4,4"-azoxy anisole or Tinuvin® dyes (from Ciba AG, Basel, Switzerland).

In another preferred embodiment the polymerisable material comprises one or more monoreactive polymerisable non-mesogenic compounds, preferably in an amount of 0 to 50%, very preferably 0 to 20%. Typical examples are alkylacrylates or alkylmethacrylates.

In another preferred embodiment the polymerisable material comprises one or more di- or multireactive polymerisable non-mesogenic compounds, preferably in an amount of 0 to 50%, very preferably 0 to 20%, alternatively or in addition to the di- or multireactive polymerisable mesogenic compounds. Typical examples of direactive non-mesogenic compounds are alkyldiacrylates or alkyldimethacrylates with alkyl groups of 1 to 20 C atoms. Typical examples of multireactive non-mesogenic compounds are trimethylpropanetrimethacrylate or pentaerythritoltetraacrylate.

It is also possible to add one or more chain transfer agents to the polymerisable material in order to modify the physical properties of the polymer film. Especially preferred are thiol compounds, for example monofunctional thiols like dodecane thiol or multifunctional thiols like trimethylpropane tri(3-mercaptopropionate). Very preferred are mesogenic or LC thiols as disclosed for example in WO 96/12209, WO 96/25470 or U.S. Pat. No. 6,420,001. By using chain transfer agents the length of the free polymer chains and/or the length of the polymer chains between two crosslinks in the polymer film can be controlled. When the amount of the chain transfer agent is increased, the polymer chain length in the polymer film decreases.

The polymerisable material may also comprise a polymeric binder or one or more monomers capable of forming a polymeric binder, and/or one or more dispersion auxiliaries. Suitable binders and dispersion auxiliaries are disclosed for example in WO 96/02597. Preferably, however, the polymerisable material does not contain a binder or dispersion auxiliary.

The polymerisable material can additionally comprise one or more additives like for example catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes, pigments or nanoparticles.

The polymer films and materials of the present invention can be used as retardation or compensation film for example in LCDs to improve the contrast and brightness at large viewing angles and reduce the chromaticity. It can be used outside the switchable LC cell of the LCD or between the substrates, usually glass substrates, forming the switchable LC cell and containing the switchable LC medium (incell application). The optical retardation ($\delta(\lambda)$) of a polymer film as a function of the wavelength of the incident beam ($\lambda$) is given by the following equation (6):

$$\delta(\lambda) = (2\pi\Delta n \cdot d)/\lambda \qquad (6)$$

wherein ($\Delta n$) is the birefringence of the film, (d) is the thickness of the film and $\lambda$ is the wavelength of the incident beam.

According to Snellius law, the birefringence as a function of the direction of the incident beam is defined as $$\Delta n = \sin\Theta/\sin\Psi \qquad (7)$$

wherein sin $\Theta$ is the incidence angle or the tilt angle of the optical axis in the film and sin is the corresponding reflection angle.

Based on these laws, the birefringence and accordingly optical retardation depends on the thickness of a film and the tilt angle of optical axis in the film (cf. Berek's compensator). Therefore, the skilled expert is aware that different optical retardations or different birefringence can be induced by adjusting the orientation of the liquid-crystalline molecules in the polymer film.

The polymer film of the present invention can also be used as alignment film for other liquid-crystalline or RM materials as described, for example, in WO 2006/039980 A1. For example, they can be used in an LCD to induce or improve alignment of the switchable liquid-crystalline medium, or to align a subsequent layer of polymerisable liquid-crystalline material coated thereon. In this way, stacks of polymerized liquid-crystalline films can be prepared.

The thickness of a polymer film according to the present invention is preferably from 0.3 to 5 microns, very preferably from 0.5 to 3 microns, most preferably from 0.7 to 2.5 microns. For use as alignment layer, a thin film with a thickness of 0.05 to 1, preferably 0.1 to 0.4 microns is preferred.

The polymer film and materials of the present invention can be used in conventional LC displays, for example displays with vertical alignment like the DAP (deformation of aligned phases), ECB (electrically controlled birefringence), CSH (colour super homeotropic), VA (vertically aligned), VAN or VAC (vertically aligned nematic or cholesteric), MVA (multi-domain vertically aligned), PVA (patterned vertically aligned) or PSVA (polymer stabilised vertically aligned) mode; displays with bend or hybrid alignment like the OCB (optically compensated bend cell or optically compensated birefringence), R-OCB (reflective OCB), HAN (hybrid aligned nematic) or pi-cell ($\pi$-cell) mode; displays with twisted alignment like the TN (twisted nematic), HTN (highly twisted nematic), STN (super twisted nematic), AMD-TN (active matrix driven TN) mode; displays of the IPS (in plane switching) mode, or displays with switching in an optically isotropic phase.

The layers, films and materials of the present invention can be used for various types of optical films, preferably selected from optically uniaxial films (A-plate, C-plate, negative C-plate, O-plate), twisted optical retarders, like for example twisted quarter wave foils (QWF), achromatic retarders, achromatic QWFs or half wave foils (HWF), and optically biaxial films. The LC phase structure in the layers and materials can be selected from cholesteric, smectic, nematic and blue phases. The alignment of the LC material in the layer can be selected from homeotropic, splayed, tilted, planar and blue-phase alignment. The layers can be uniformly oriented or exhibit a pattern of different orientations.

The films can be used as optical compensator for viewing angle enhancement of LCD's or as a component in a brightness enhancement element, furthermore as an achromatic retarder, for example in reflective or transflective LCD's. Further preferred applications and devices include
retarding components in optoelectronic devices requiring similar phase shift at multiple wavelengths, such as combined CD/DVD/HD-DVD/Blue-Ray, including reading, writing re-writing data storage systems
achromatic retarders for optical devices such as cameras
achromatic retarders for displays including OLED and LCD's.

The present invention is described above and below with particular reference to the preferred embodiments. It should be understood that various changes and modifications might be made therein without departing from the spirit and scope of the invention.

Above and below, unless stated otherwise, all percentages are percent by weight. All temperatures are given in degrees Celsius. "m.p." denotes the melting point, "cl.p." denotes the clearing point, "$T_g$" denotes the glass transition temperature. Furthermore, C=crystalline state, N=nematic phase, S=smectic phase and I=isotropic phase. The data between or behind these symbols represent the transition temperatures. $\Delta n$ denotes the optical anisotropy ($\Delta n = n_e - n_o$, where $n_o$ denotes the refractive index parallel to the longitudinal molecular axes and $n_e$ denotes the refractive index perpendicular thereto), measured at 550 nm and 20° C. The optical and electro optical data are measured at 20° C., unless expressly stated otherwise.

Method of measuring the refractive indices of novel single compounds: The refractive indices of a liquid crystal mixture commercially available from Merck KGaA under the product code ZLI4792 are measured using an Abbe refractometer at 20° C. and using a light of wavelength 550 nm. This mixture is then doped with 10% w/w of the compound under test and the refractive indices are remeasured. Extrapolation to 100% gives the refractive index of the compound under test.

Unless stated otherwise, the percentages of a component of a polymerisable LC material as given above and below are % in weight and refer to the total amount of solids in the polymerisable mixture, i.e. not including solvents.

Many of the compounds or mixtures thereof mentioned above and below are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here. Unless the context clearly indicates otherwise, as used herein plural forms of the terms herein are to be construed as including the singular form and vice versa.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

Throughout the description and claims of this specification, the words "obtainable" and "obtained" and variations of the words, mean "including but not limited to", and are not intended to (and do not) exclude other components. On the other hand, the word "obtainable" also encompasses the term "obtained" but is not limited to it.

It will be appreciated that variations to the foregoing embodiments of the invention can be made while still falling within the scope of the invention. Alternative features serving the same, equivalent, or similar purpose may replace each feature disclosed in this specification, unless stated otherwise. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

The invention will now be described in more detail by reference to the following working examples, which are illustrative only and do not limit the scope of the invention.

EXAMPLES

For the preparation of the following mixtures, the following compounds and abbreviations are used:

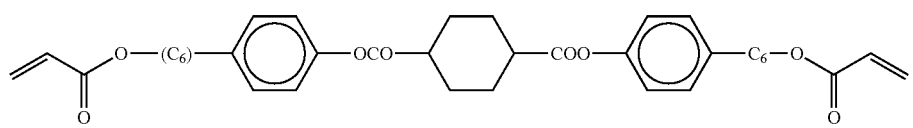

RM 1

-continued

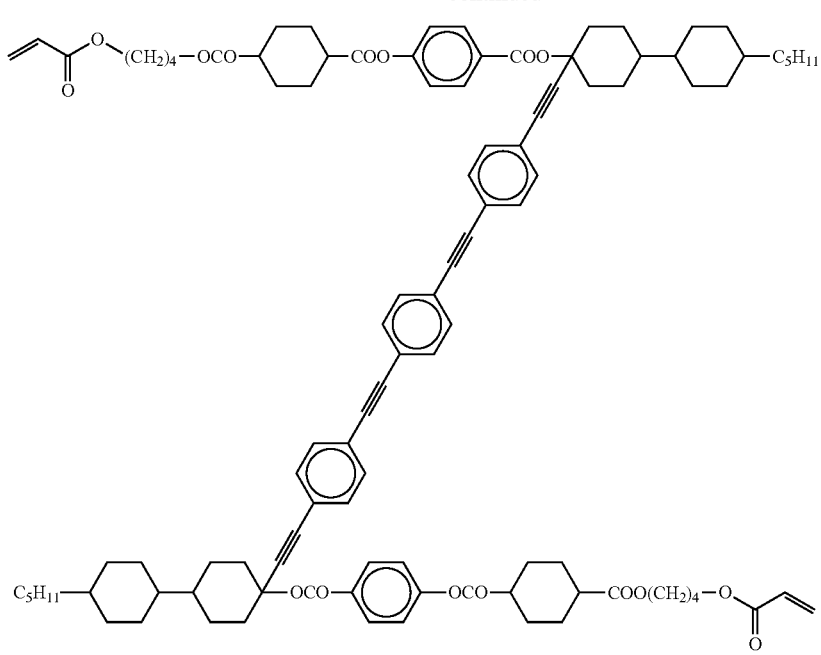

RM 2

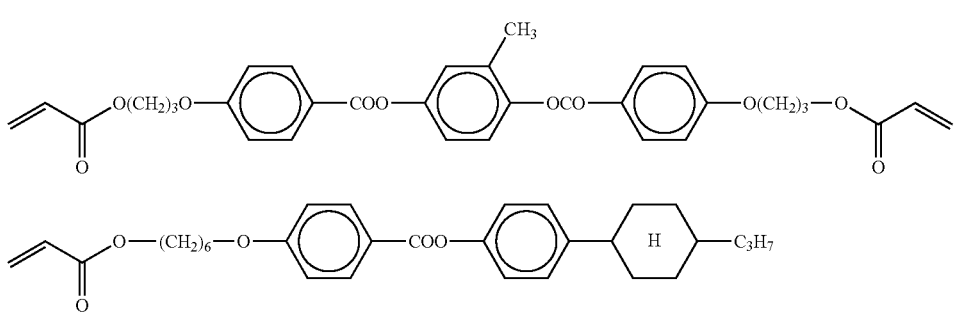

RM 3

RM 4

LC242 is a polymerisable chiral material commercially available from BASF AG (Ludwigshafen, Germany).

General Method for the Polymer Film Preparation:

First, a 33.3% w/w solution of the corresponding LC medium in Toluene/Cyclohexane solution (7:3) is prepared.

The solution is spin coated at 3000 rpm for 30 s onto a rubbed polyimide coated glass slide where it aligns homeotropically.

The sample is annealed at the given temperature for 60 s on a temperature controlled hot plate.

The sample is cooled for 60 s to 20° C. under a nitrogen atmosphere and then UV cured (365 nm filter, 80 mW/cm²) for 60 s at 20° C.

Retardation is measured at angles of incidence from −40° to 60° at 20° intervals at a temperature of 20° C. and at a wavelengths ranging from 400 to 700 nm.

Comparative Example 1

The following mixture having a clearing point of 81° C. and a birefringence of 0.06 at 550 nm is formulated (in wt. %):

| | |
|---|---|
| Irgacure ® 369 | 1.00 |
| Irganox ® 1076 | 0.12 |
| LC242 | 24.98 |
| RM 2 | 40.00 |

-continued

| | |
|---|---|
| RM 3 | 17.91 |
| RM 4 | 14.99 |
| Zonyl FSO ® 100 | 1.00 |

The mixture can be annealed at temperatures ranging from 69 to 61° C.

Figure 1A:
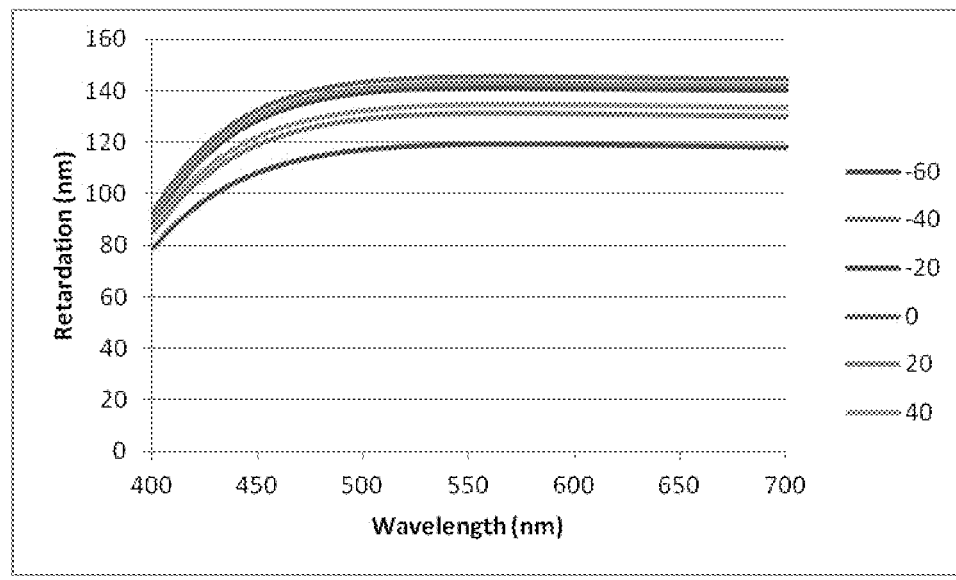
FIGS. 1a and 1b show the retardation dispersion and retardation versus viewing angle at different wavelengths for the mixture of Comparative Example 1.
Figure 1B:
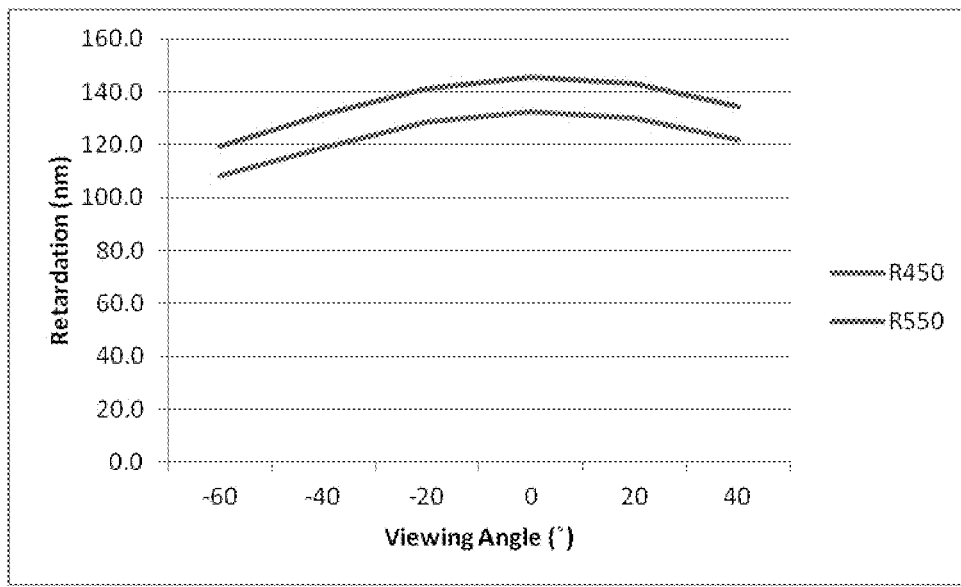

The retardation profile (retardation dispersion and retardation versus viewing angle at different wavelengths) as shown in FIGS. 1a and 1b is measured using an ellipsometer, and the thickness of 2.29 µm is measured using a surface profiler.

The retardation dispersion values at different angles of incidence are shown in Table 1 below.

TABLE 1

| | Angle (°) | | | | | |
|---|---|---|---|---|---|---|
| | 60 | 40 | 20 | 0 | −20 | −40 |
| $R_{550}$ | 119.1 | 131.5 | 141.8 | 146.2 | 143.7 | 135.2 |
| $R_{450}/R_{550}$ | 0.909 | 0.906 | 0.905 | 0.905 | 0.905 | 0.905 |

In order to test the durability of the polymer film, the film is exposed to a temperature of 80° C. for a time up to 169 h. Table 1.1 summarizes the result of the durability test

TABLE 1.1

| | Time at 80° C. [h] | | | | | | | |
|---|---|---|---|---|---|---|---|---|
| | 0 | 0.5 | 1 | 2 | 4 | 7 | 24 | 169 |
| R(450)/R(550) | 0.905 | 0.935 | 0.939 | 0.943 | 0.947 | 0.950 | 0.953 | 0.961 |

Example 1

The following mixture having a clearing point of 81° C. and a birefringence of 0.06 at 550 nm is formulated (in wt. %):

| | |
|---|---|
| Irgacure ® 369 | 1.00 |
| Irganox ® 1076 | 0.12 |
| LC242 | 16.66 |
| RM 1 | 37.63 |
| RM 2 | 30.00 |
| RM 4 | 13.59 |
| Zonyl FSO ® 100 | 1.00 |

The mixture can be annealed at temperatures ranging from 80 to 51° C.

Figure 2A:
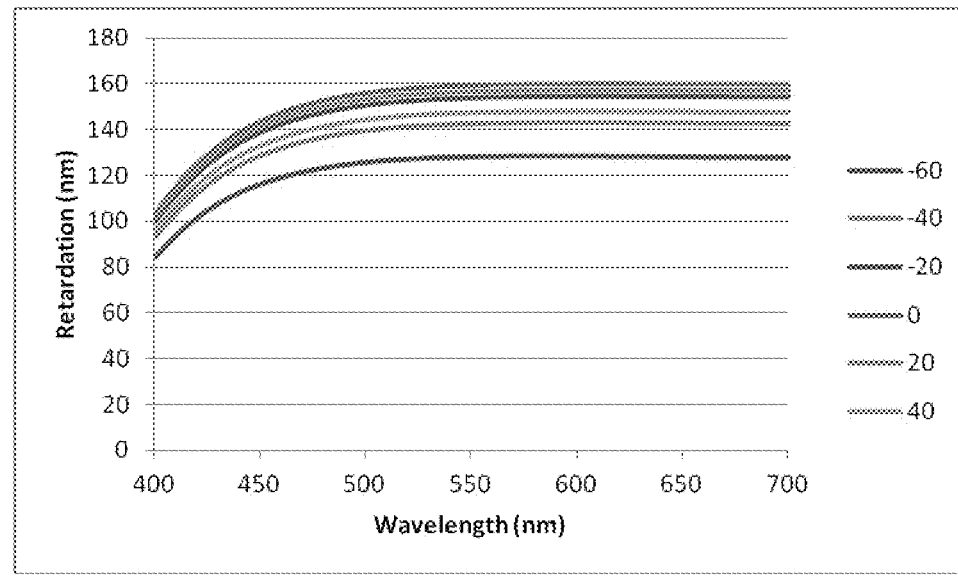
FIGS. 2a and 2b show the retardation dispersion and retardation versus viewing angle at different wavelengths for the mixture of Example 1.
Figure 2B:

The retardation profile (retardation dispersion and retardation versus viewing angle at different wavelengths) as shown in FIGS. 2a and 2b is measured using an ellipsometer, and the thickness of 2.29 μm is measured using a surface profiler.

The retardation dispersion values at different angles of incidence are shown in Table 2 below.

TABLE 2

| | Angle (°) | | | | | |
|---|---|---|---|---|---|---|
| | 60 | 40 | 20 | 0 | −20 | −40 |
| R550 | 131.2 | 145.7 | 157.9 | 163.4 | 160.6 | 150.7 |
| R450/R550 | 0.925 | 0.920 | 0.919 | 0.918 | 0.918 | 0.919 |

In order to test the durability of the polymer film, the film is exposed to a temperature of 80° C. for a time up to 169 h. Table 2.1 summarizes the result of the durability test

TABLE 2.1

| | Time at 80° C. [h] | | | | | | | |
|---|---|---|---|---|---|---|---|---|
| | 0 | 0.5 | 1 | 2 | 4 | 7 | 24 | 169 |
| R(450)/R(550) | 0.900 | 0.909 | 0.910 | 0.912 | 0.912 | 0.913 | 0.915 | 0.919 |

Comparative Example 2

The following mixture having a clearing point of 83° C. and a birefringence of 0.06 at 550 nm is formulated (in wt. %):

| | |
|---|---|
| Irgacure ® 369 | 1.00 |
| Irganox ® 1076 | 0.12 |
| LC242 | 26.30 |
| RM 2 | 40.00 |
| RM 3 | 18.87 |
| RM 4 | 13.11 |
| TegoTwin ® 4100 | 0.60 |

The mixture can be annealed at temperatures ranging from 71 to 65° C.

Figure 3A:
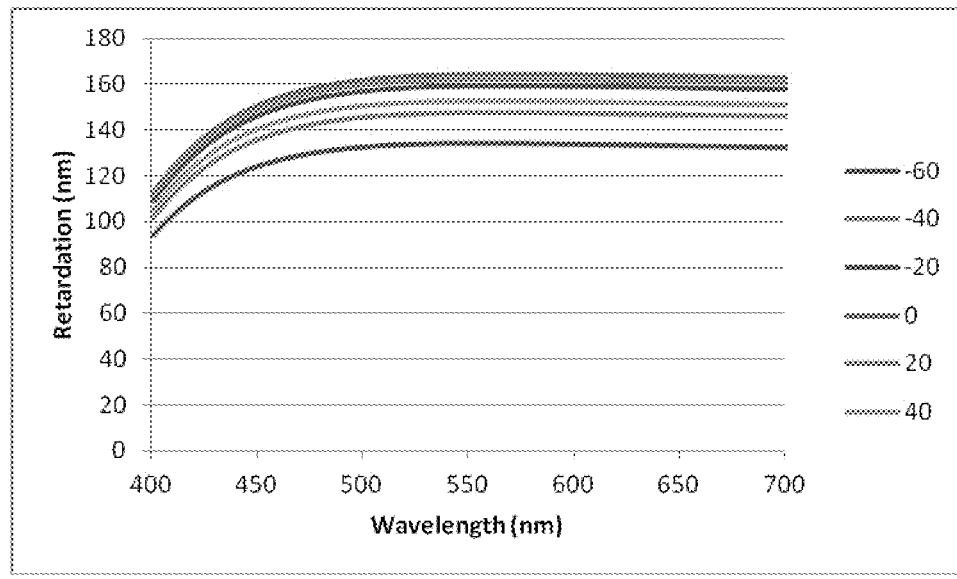
FIGS. 3a and 3b show the retardation dispersion and retardation versus viewing angle at different wavelengths for the mixture of Comparative Example 2.
Figure 3B:
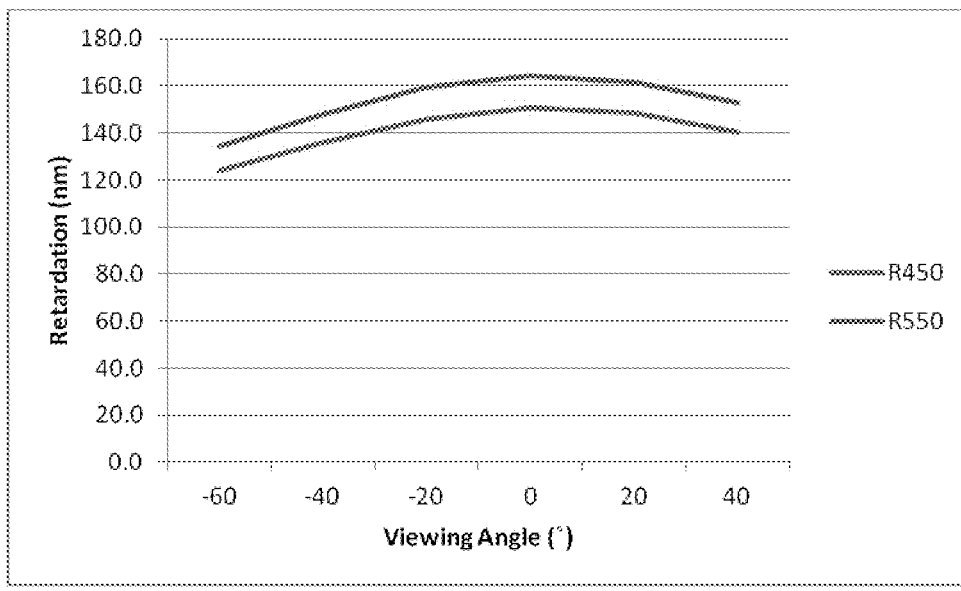

The retardation profile (retardation dispersion and retardation versus viewing angle at different wavelengths) as shown in FIGS. 3a and 3b is measured using an ellipsometer and the thickness of 2.29 μm is measured using a surface profiler.

The retardation dispersion values at different angles of incidence are shown in Table 3 below.

TABLE 3

| | Angle (°) | | | | | |
|---|---|---|---|---|---|---|
| | 60 | 40 | 20 | 0 | −20 | −40 |
| R550 | 129.4 | 142.5 | 153.8 | 159.1 | 156.7 | 147.9 |
| R450/R550 | 0.925 | 0.920 | 0.918 | 0.917 | 0.918 | 0.920 |

In order to test the durability of the polymer film, the film is exposed to a temperature of 80° C. for a time up to 260 h. Table 3.1 summarizes the result of the durability test

TABLE 3.1

| | Time at 80° C. [h] | | | | | | | |
|---|---|---|---|---|---|---|---|---|
| | 0 | 0.5 | 1 | 2 | 5 | 22 | 97 | 260 |
| R(450)/R(550) | 0.918 | 0.949 | 0.953 | 0.956 | 0.961 | 0.968 | 0.976 | 0.986 |

Example 2

The following mixture having a clearing point of 76° C. and a birefringence of 0.06 at 550 nm is formulated (in wt. %):

| | |
|---|---|
| Irgacure ® 369 | 1.00 |
| Irganox ® 1076 | 0.12 |
| LC242 | 26.88 |
| RM 1 | 37.63 |
| RM 2 | 30.00 |
| RM 4 | 3.77 |
| TegoTwin ® 4100 | 0.60 |

The mixture can be annealed at temperatures ranging from 70 to 52° C.

Figure 4A:
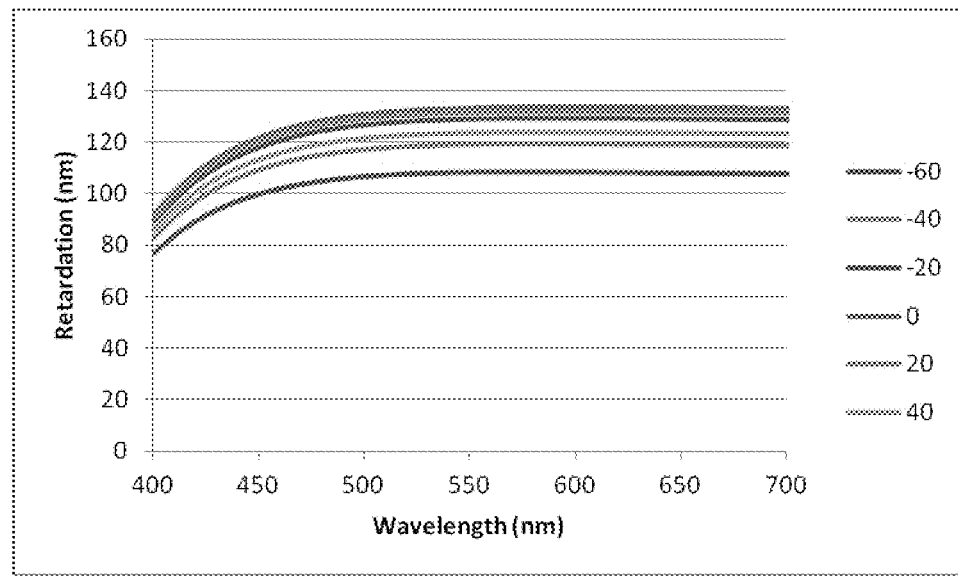
FIGS. 4a and 4b show the retardation dispersion and retardation versus viewing angle at different wavelengths for the mixture of Example 4.
Figure 4B:

The retardation profile (retardation dispersion and retardation versus viewing angle at different wavelengths) as shown in FIGS. 4a and 4b is measured using an ellipsometer and the thickness of 2.29 μm is measured using a surface profiler.

The retardation dispersion values at different angles of incidence are shown in Table 4 below.

TABLE 4

| | Angle (°) | | | | | |
|---|---|---|---|---|---|---|
| | 60 | 40 | 20 | 0 | −20 | −40 |
| R550 | 109.0 | 120.2 | 129.8 | 134.2 | 132.2 | 124.8 |
| R450/R550 | 0.921 | 0.917 | 0.914 | 0.914 | 0.914 | 0.916 |

In order to test the durability of the polymer film, the film is exposed to a temperature of 80° C. for a time up to 260 h. Table 4.1 summarizes the result of the durability test

TABLE 4.1

| | Time at 80° C. [h] | | | | | | | |
|---|---|---|---|---|---|---|---|---|
| | 0 | 0.5 | 1 | 2 | 5 | 22 | 97 | 260 |
| R(450)/R(550) | 0.914 | 0.922 | 0.924 | 0.924 | 0.926 | 0.928 | 0.931 | 0.934 |

Dispersion Control

The following mixtures comprising each 1.00 wt. % Irgacure® 369, 0.08 wt. % Irganox® 1076 and 1.00 wt. % Zonyl FSO® 100, are formulated (in wt. %):

| No. | RM 1 | RM 2 | RM 3 | RM 4 | LC 242 | $R_{450}/R_{550}$ |
|---|---|---|---|---|---|---|
| I | 0.00 | 40.00 | 17.92 | 15.00 | 25.00 | 0.90 |
| II | 3.25 | 40.00 | 14.67 | 15.00 | 25.00 | 0.88 |
| III | 6.51 | 40.00 | 11.41 | 15.00 | 25.00 | 0.87 |
| IV | 9.77 | 40.00 | 8.15 | 15.00 | 25.00 | 0.85 |
| V | 13.04 | 40.00 | 4.88 | 15.00 | 25.00 | 0.83 |
| VI | 17.92 | 40.00 | 0.00 | 15.00 | 25.00 | 0.79 |

As can be seen from the values for $R_{450}/R_{550}$, RM 1 is required to achieve a strong negative dispersion effect and by using RM 1, dispersions as low as 0.79 can be achieved.

The invention claimed is:

1. A polymerizable liquid crystal medium comprising one or more compounds of formula A, $$P-Sp-\underset{(L^a)_r}{\phantom{X}}-OOC-H-COO-\underset{(L^a)_r}{\phantom{X}}-Sp-P \quad A$$

wherein

P is independently of one another, a polymerizable group,

Sp is a spacer group or a single bond, $L^a$ is, in case of multiple occurrence identically or differently, F, Cl, CN, SCN, $SF_5$ or a straight-chain or branched, unsubstituted or mono- or polyfluorinated, alkyl, alkoxy, alkenyl, alkynyl, alkylcarbonyl, alkoxycarbonyl, alkylcarbonyloxy or alkoxycarbonyloxy having up to 12 C atoms, or optionally halogenated alkyl, alkoxy, alkylcarbonyl, alkoxycarbonyl, alkylcarbonyloxy or alkoxycarbonyloxy with up to 5 C atoms, r is 0, 1, 2, 3 or 4, wherein the amount of compounds of formula A in the medium as a whole is from 5 to 40 wt. %; and one or more compounds of formula I, $$R^1-(A^1-Z^1)_m-U^1-(Z^2-A^2)_n-R^2 \atop \underset{|}{(B)_q} \atop R^3-(A^3-Z^3)_o-U^2-(Z^4-A^4)_p-R^4 \quad I$$

wherein $U^{1,2}$ are independently of each other selected from including their mirror images, wherein the rings $U^1$ and $U^2$ are each bonded to the bridging group $-(B)_q$- via the axial bond, and one or two non-adjacent $CH_2$ groups in these rings are each optionally replaced by O or S, and the rings $U^1$ and $U^2$ are optionally substituted by one or more groups L, L is, in case of multiple occurrence identically or differently, P-Sp-, F, Cl, Br, I, —CN, —$NO_2$, —NCO, —NCS, —OCN, —SCN, —C(=O)$NR^0R^{00}$, —C(=O)X, —C(=O)$OR^0$, —C(=O)$R^0$, —$NR^0R^{00}$, —OH, —$SF_5$, optionally substituted silyl, aryl or heteroaryl with up to 12 C atoms, and straight chain or branched alkyl, alkoxy, alkylcarbonyl, alkoxycarbonyl, alkylcarbonyloxy or alkoxycarbonyloxy with up to 12 C atoms, wherein one or more H atoms are each optionally replaced by F or Cl, X is halogen, $Q^{1,2}$ are independently of each other CH or SiH, $Q^3$ is C or Si, B is in each occurrence independently of one another —C≡C-, —$CY^1$=$CY^2$- or an optionally substituted aromatic or heteroaromatic group, $Y^{1,2}$ are independently of each other H, F, Cl, CN or $R^0$, q is an integer from 1 to 10, $A^{1-4}$ are independently of each other selected from non-aromatic, aromatic or heteroaromatic carbocyclic or heterocyclic groups, which are unsubstituted or substituted by one or more groups $R^5$, and wherein each of $-(A^1-Z^1)_m-U^1-(Z^2-A^2)_n-$ and $-(A^3-Z^3)_o-U^2-(Z^4-A^4)_p-$ does not contain more aromatic groups than non-aromatic groups, $Z^{1-4}$ are independently of each other —O—, —S—, —CO—, —COO—, —OCO—, —O—COO—, —CO—$NR^0$—, —$NR^0$—CO—, —$NR^0$—CO—$NR^0$—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$(CH_2)_3$—, —$(CH_2)_4$—, —$CF_2CH_2$—, —$CH_2CF_2$—, —$CF_2CF_2$—, —CH=CH—, —$CY^1$=$CY^2$—, —CH=N—, —N=CH—, —N=N—, —CH=$CR^0$—, —C≡C—, —CH=CH—COO—, —OCO—CH=CH—, $CR^0R^{00}$ or a single bond, $R^0$ and $R^{00}$ are independently of each other H or alkyl with 1 to 12 C-atoms, m and n are independently of each other 0, 1, 2, 3 or 4, o and p are independently of each other 0, 1, 2, 3 or 4, $R^{1-5}$ are independently of each other identical or different groups selected from H, halogen, —CN, —NC, —NCO, —NCS, —OCN, —SCN, —C(=O)$NR^0R^{00}$, —C(=O)$X^0$, —C(=O)$R^0$, —$NH_2$, —$NR^0R^{00}$, —SH, —$SR^0$, —$SO_3H$, —$SO_2R^0$, —OH, —$NO_2$, —$CF_3$, —$SF_5$, P—Sp-, optionally substituted silyl, and carbyl or hydrocarbyl with 1 to 40 C atoms that is optionally substituted and optionally comprises one or more hetero atoms, or denote P or P-Sp-, or are substituted by P or P-Sp-, wherein the compounds comprise at least one group $R^{1-5}$ denoting or being substituted by P or P-Sp-, P is a polymerizable group, and Sp is a spacer group or a single bond.

2. The polymerizable liquid crystal medium according to claim 1, wherein compounds of formula A are selected from the following subformula,

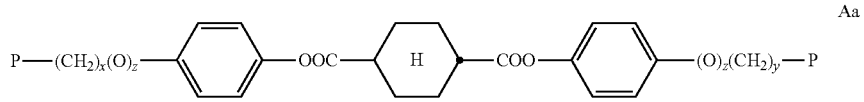
Aa wherein x, y, z, are independently of each other 0 or identical or different integers from 1 to 12.

3. The polymerizable liquid crystal medium according to claim 1, wherein the bridging group —(B)$_q$— is selected from —C≡C—, —C≡C—C≡C—, —C≡C—C≡C—C≡C—, —C≡C—C≡C—C≡C—C≡C—,

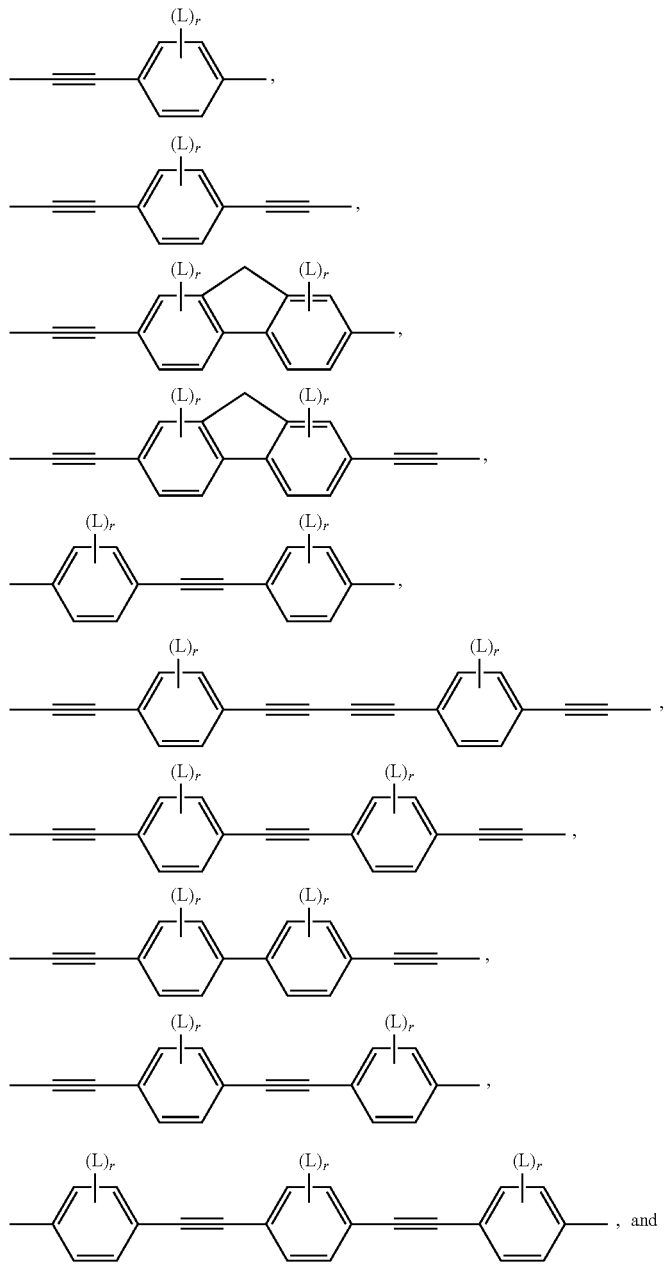

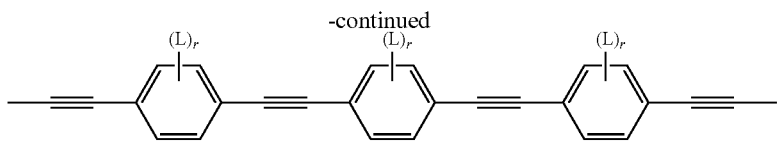

wherein
r is 0, 1, 2, 3 or 4,
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with up to 12 C atoms, and straight chain or branched alkyl, alkoxy, alkylcarbonyl, alkoxycarbonyl, alkylcarbonyloxy or alkoxycarbonyloxy with up to 12 C atoms, wherein one or more H atoms are each optionally replaced by F or Cl,
R$^0$ and R$^{00}$ are independently of each other H or alkyl with 1 to 12 C-atoms, and
X is halogen.

4. The polymerizable liquid crystal medium according to claim 1, wherein the non-aromatic rings of the mesogenic groups U$^1$ and U$^2$ are selected from

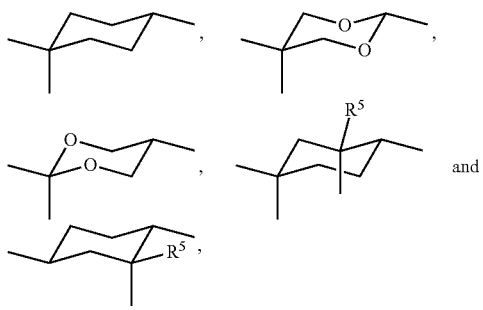

and wherein R$^5$ has one of the meanings as given above in claim 1.

5. The polymerizable liquid crystal medium according to claim 1, wherein A$^{1-4}$ are trans-1,4-cyclohexylene or 1,4-phenylene, which in each case is unsubstituted or substituted with one or more groups L, wherein L is P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with up to 12 C atoms, or straight chain or branched alkyl, alkoxy, alkylcarbonyl, alkoxycarbonyl, alkylcarbonyloxy or alkoxycarbonyloxy with up to 12 C atoms, wherein one or more H atoms are optionally replaced by F or Cl, wherein R$^0$ and R$^{00}$ are independently of each other H or alkyl with 1 to 12 C-atoms, and X is halogen.

6. The polymerizable liquid crystal medium according to claim 1, wherein Z$^{1-4}$ are selected from —O—, —S—, —CO—, —COO—, —OCO—, —O—COO—, —CO—NR$^0$—, —NR$^0$—CO—, —NR$^0$—CO—NR$^0$—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —(CH$_2$)$_3$—, —(CH$_2$)$_4$—, —CF$_2$CH$_2$—, —CH$_2$CF$_2$—, —CF$_2$CF$_2$—, —CH=CH—, —CY$^1$=CY$^2$—, —CH=N—, —N=CH—, —N=N—, —CH=CR$^0$—, —C≡C—, —CH=CH—COO—, —OCO—CH=CH—, CR$^0$R$^{00}$ or a single bond, wherein R$^0$, R$^{00}$, Y$^1$ and Y$^2$ have the meanings given in claim 1.

7. The polymerizable liquid crystal according to claim 1, wherein the polymerizable compounds of formula I are selected from the following subformulae:

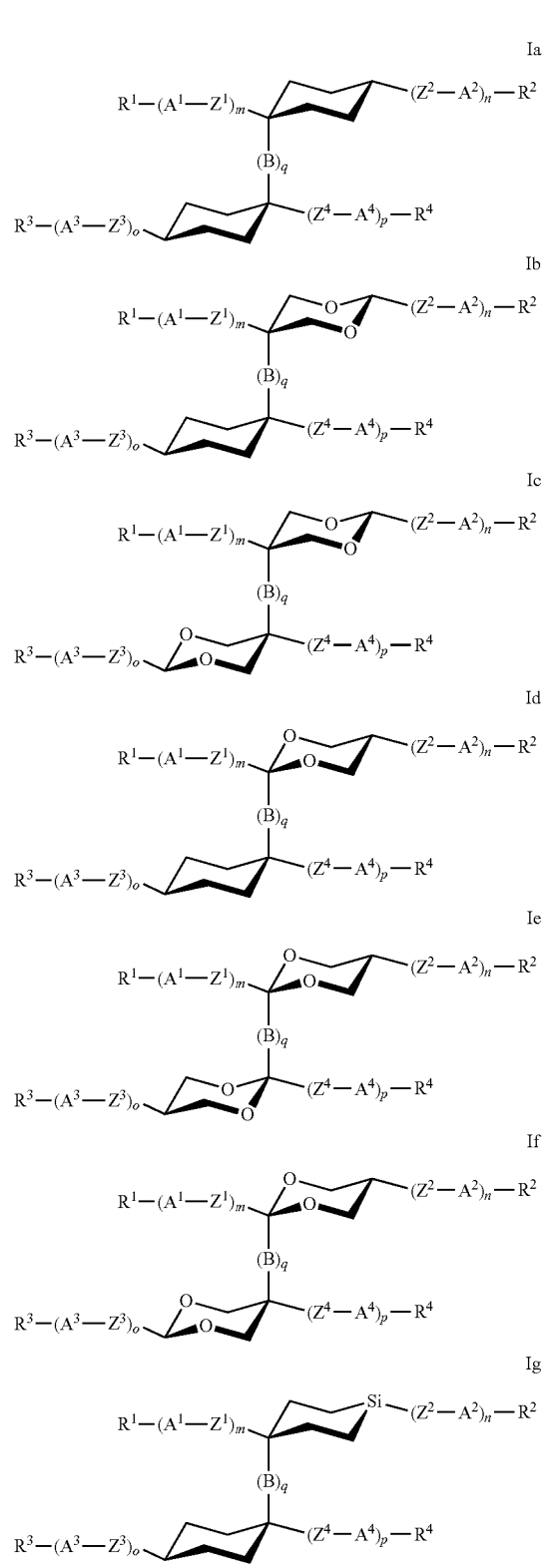

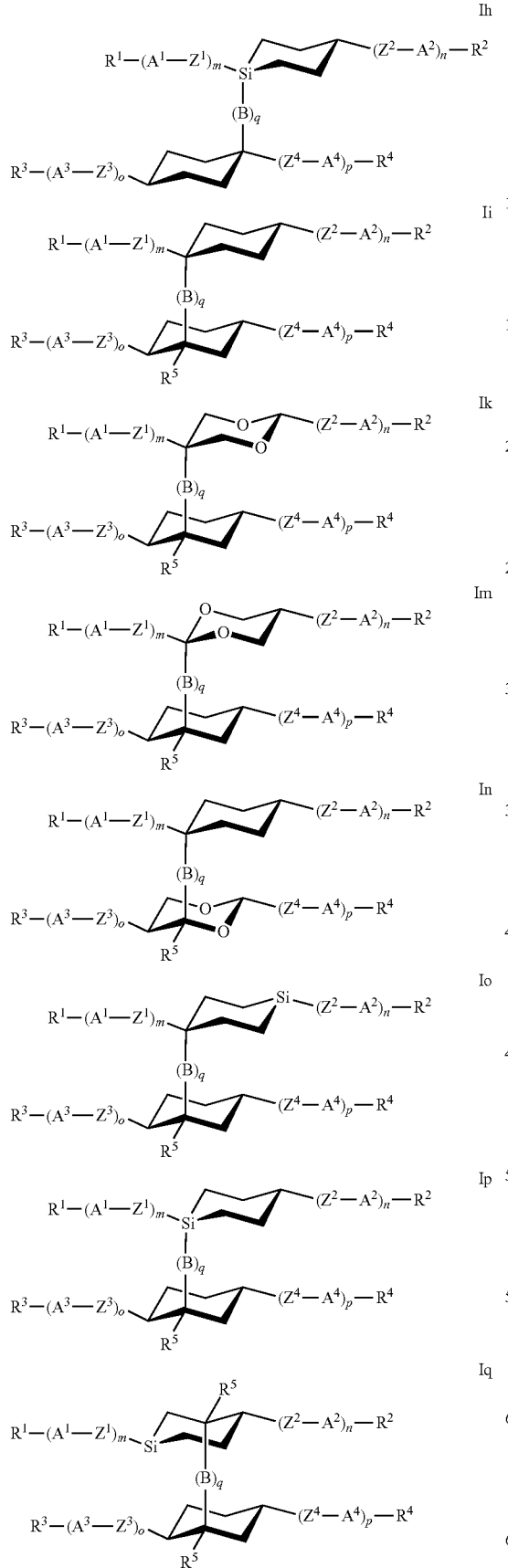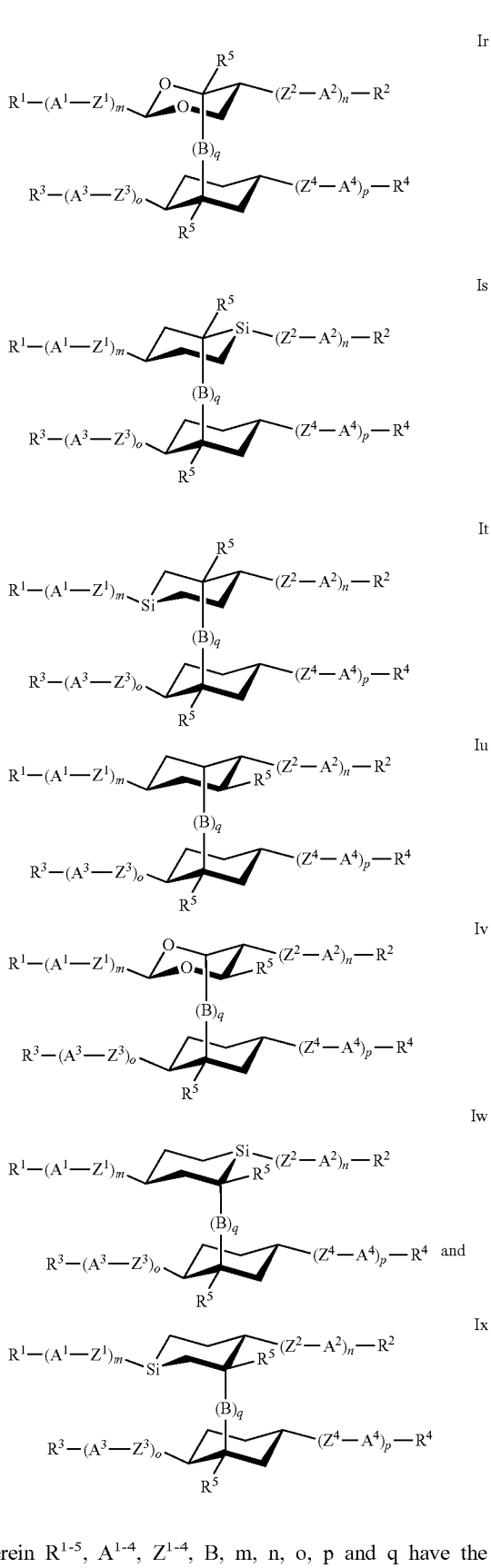
wherein R[1-5], A[1-4], Z[1-4], B, m, n, o, p and q have the meanings given in claim 1.

8. The polymerizable liquid crystal medium according claim 1, characterized in that the polymerizable compounds of formula I are selected from the following subformulae:
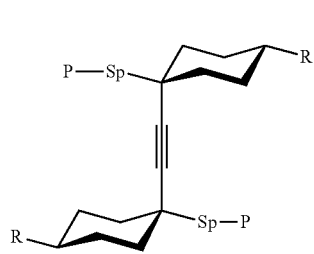
I1
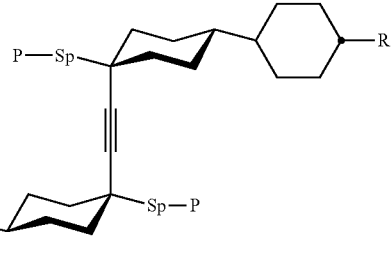
I2
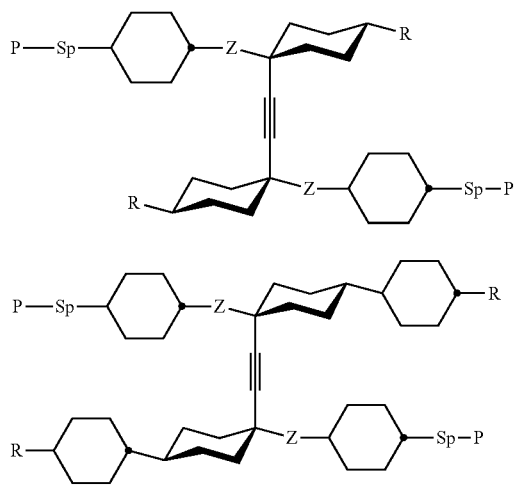
I3 I4
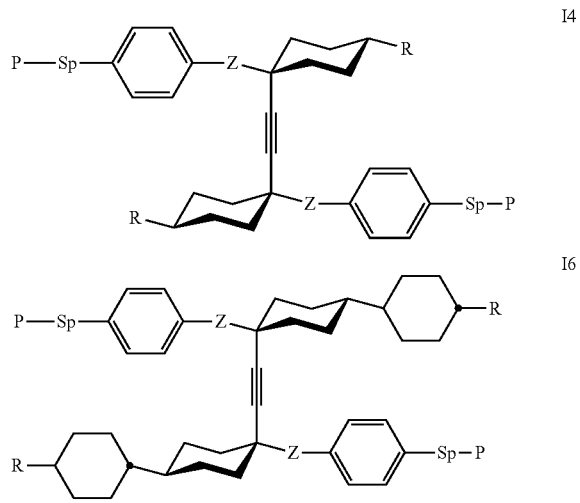
I5 I6
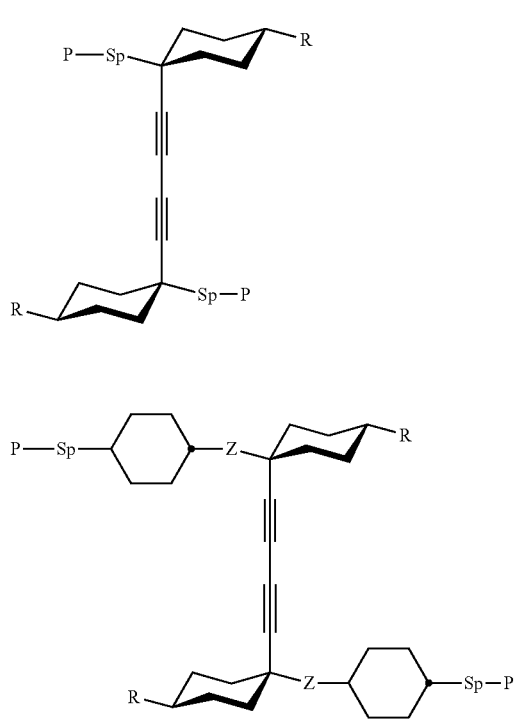
I7
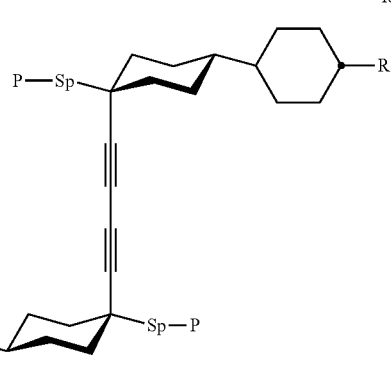
I8
I9 I10

I11
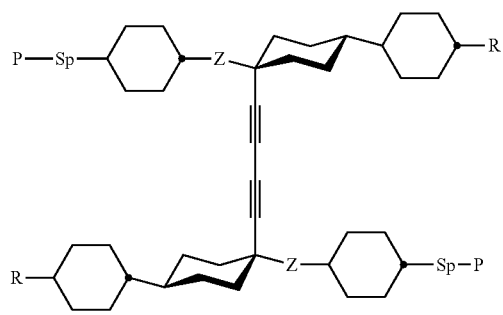
I12
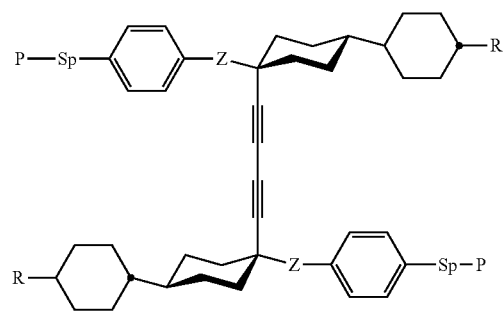
I13
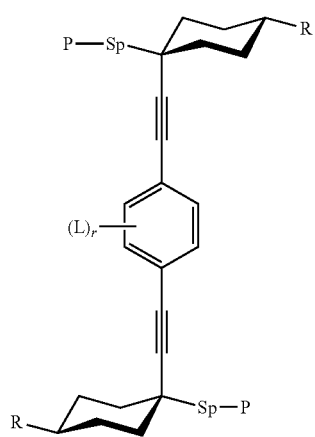
I14
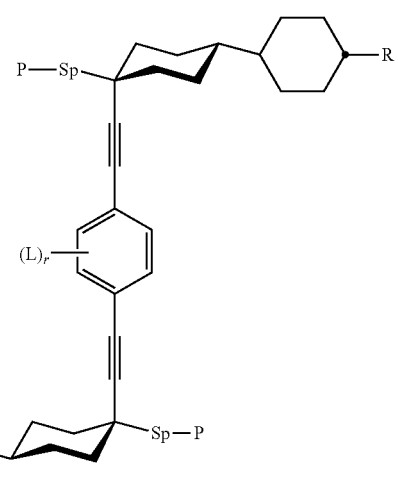
I15
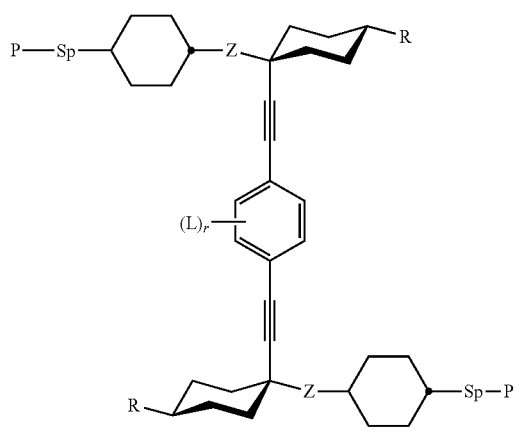
I16
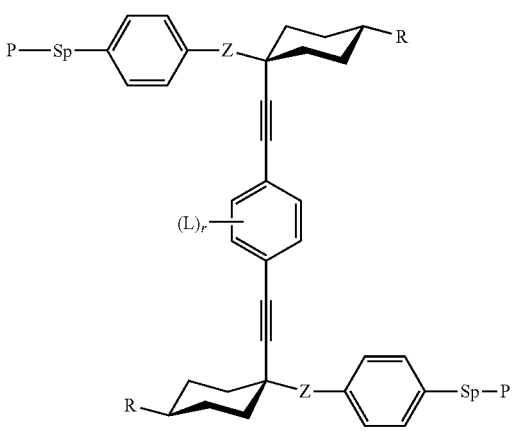
I17
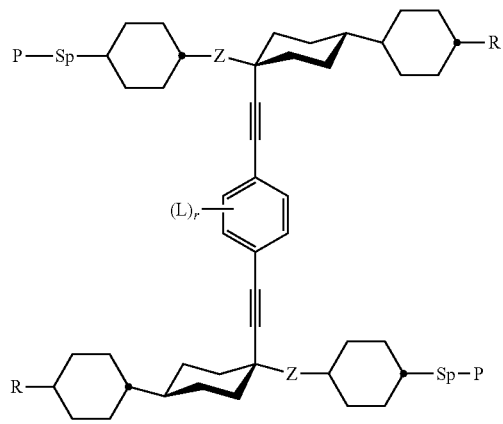
I18
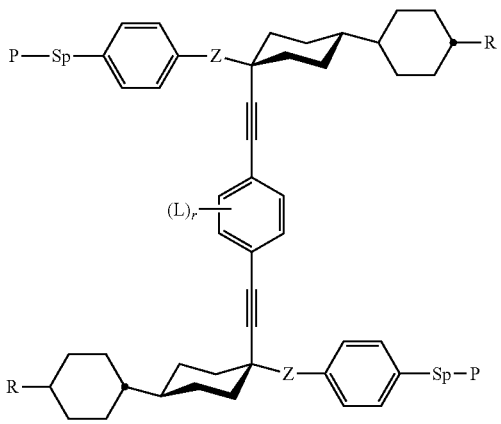

-continued
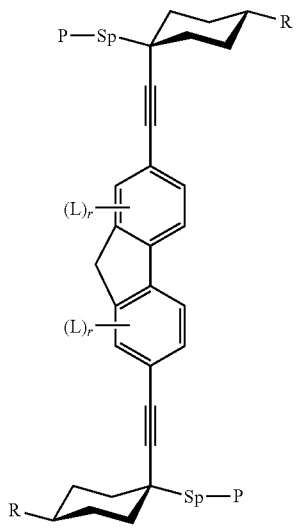
I19
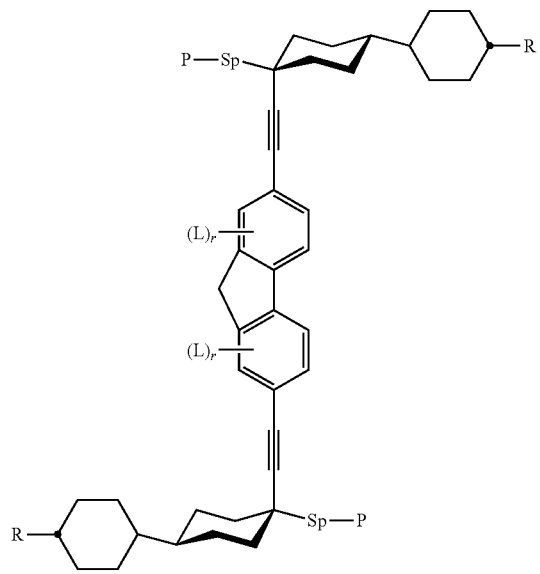
I20
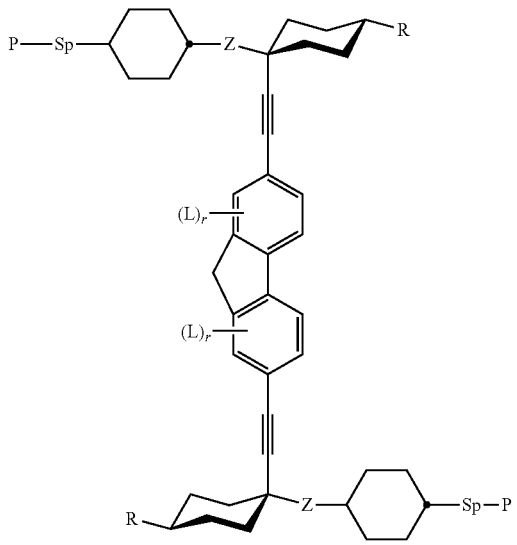
I21
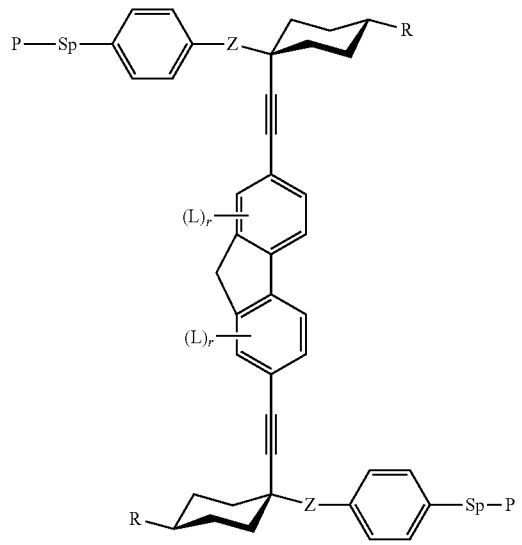
I22
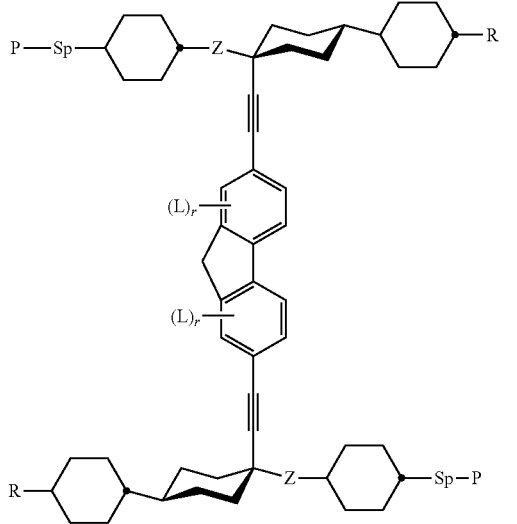
I23
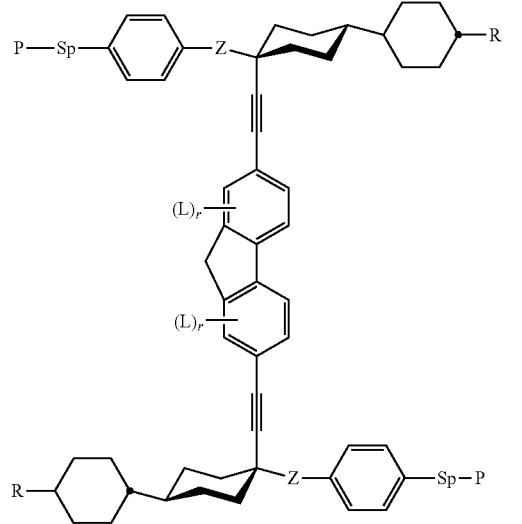
I24

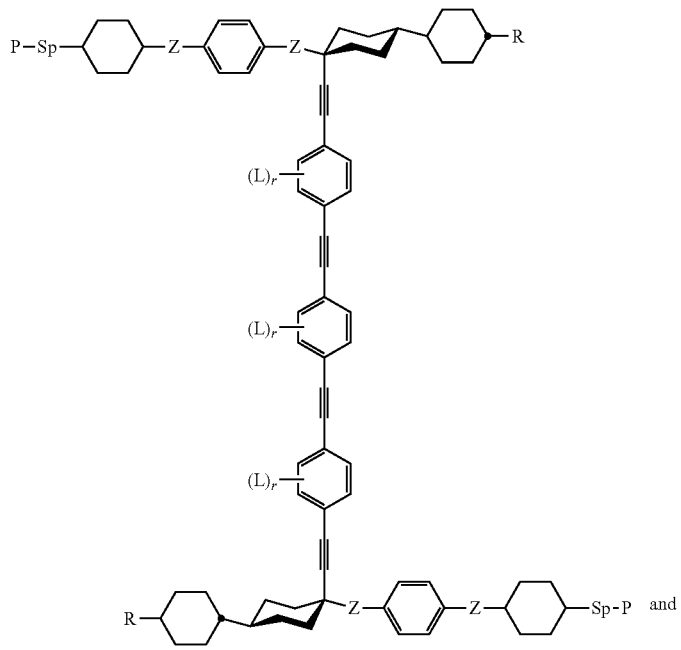

I25

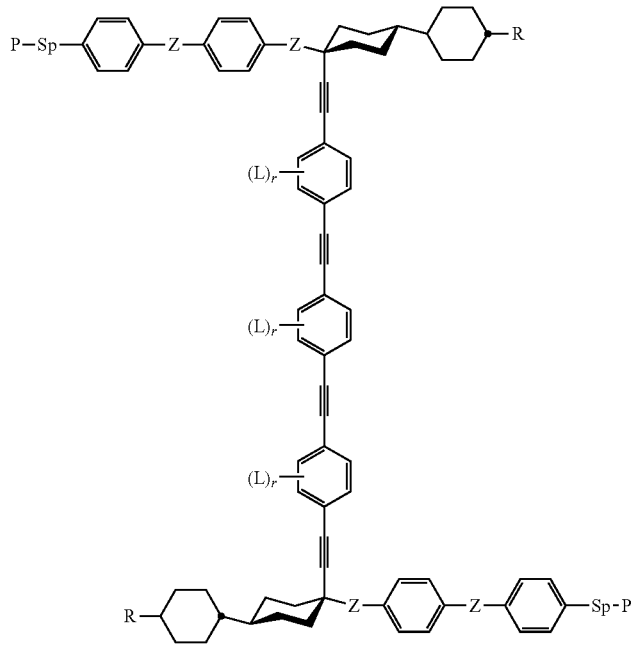

I26 wherein

Z is —O—, —S—, —CO—, —COO—, —OCO—, —O—COO—, —CO—NR⁰—, —NR⁰—CO—, —NR⁰—CO—NR⁰—, —OCH₂—, —CH₂O—, —SCH₂—, —CH₂S—, —CF₂O—, —OCF₂—, —CF₂S—, —SCF₂—, —CH₂CH₂—, —(CH₂)₃—, —CF₂CH₂—, —CH₂CF₂—, —CF₂CF₂—, —CH=CH—, —CY¹=CY²—, —CH=N—, —N=CH—, —N=N—, —CH=CR⁰—, —C≡C—, —CH=CH—COO—, —OCO—CH=CH—, CR⁰R⁰⁰ or a single bond, R is H, halogen, —CN, —NC, —NCO, —NCS, —OCN, —SCN, —C(=O)NR⁰R⁰⁰, —C(=O)X⁰, —C(=O) R⁰, —NH₂, —NR⁰R⁰⁰, —SH, —SR⁰, —SO₃H, —SO₂R⁰, —OH, —NO₂—CF₃, —SF₅, optionally substituted silyl, or carbyl or hydrocarbyl with 1 to 40 C atoms that is optionally substituted and optionally comprises one or more hetero atoms, and P, Sp, L and r are as defined in claim 1, and the benzene rings in the mesogenic groups are optionally substituted by one or more groups L as defined in claim 1.

9. The polymerizable liquid crystal medium according to claim 8, wherein the polymerizable compounds of formula I are selected from sub formulae I 25 or I 26, Z denotes —COO—, and r is in each occurrence 0.

10. The polymerizable liquid crystal medium according to claim 1, further comprising one or more further compounds that are optionally polymerizable and/or mesogenic or liquid crystalline.

11. A polymer film obtainable by polymerizing the polymerizable LC medium as defined in claim 1 having a liquid crystal in an oriented state in form of a thin film.

12. An optical, electronic or electro optical device, or a component thereof, comprising a polymer film according to claim 11.

13. An optical component according to claim 12, wherein said optical component is an optically uniaxial film selected from an A-plate, C-plate, negative C-plate or O-plate, a twisted optical retarder, a twisted quarter wave foil, an optically biaxial film, an achromatic retarder, an achromatic quarter wave foil or half wave foil, a film having a cholesteric, smectic, nematic or blue phase, and a film having homeotropic, splayed, tilted, planar or blue-phase alignment, which is uniformly oriented or exhibits a pattern of different orientations.

14. An optical component according to claim 12, wherein said optical component is an optical compensation film for viewing angle enhancement of a liquid crystal display, a component in a brightness enhancement film, or an achromatic element in reflective or transflective liquid crystal display.

15. A device or component according to claim 12, wherein said device or component is selected from electrooptical displays, liquid crystal displays, optical films, polarizers, compensators, beam splitters, reflective films, alignment layers, color filters, holographic elements, hot stamping foils, colored images, decorative or security markings, LC pigments, adhesives, non-linear optic devices, optical information storage devices, electronic devices, organic semiconductors, organic field effect transistors, integrated circuits, thin film transistors, Radio Frequency Identification (RFID) tags, organic light emitting diodes, organic light emitting transistors, electroluminescent displays, organic photovoltaic devices, organic solar cells, organic laser diodes, organic integrated circuits, lighting devices, sensor devices, electrode materials, photoconductors, photodetectors, electrophotographic recording devices, capacitors, charge injection layers, Schottky diodes, planarizing layers, antistatic films, conducting substrates, conducting patterns, photoconductors, electrophotographic applications, electrophotographic recording, organic memory devices, biosensors, biochips, optoelectronic devices requiring similar phase shift at multiple wavelengths, combined CD/DVD/HD-DVD/Blu-Rays, reading, writing re-writing data storage systems, and cameras.

16. Device or component according to claim 12, wherein said device or component is selected from electro optical displays, liquid crystal displays, optical films, polarizers, compensators, beam splitters, reflective films, alignment layers, filters, holographic elements, hot stamping foils, colored images, decorative or security markings, liquid crystal pigments, adhesives, non-linear optic devices, optical information storage devices, electronic devices, organic semiconductors, organic field effect transistors, integrated circuits, thin film transistors, Radio Frequency Identification tags, organic light emitting diodes, organic light emitting transistors, electroluminescent displays, organic photovoltaic devices, organic solar cells, organic laser diodes, organic integrated circuits, lighting devices, sensor devices, electrode materials, photoconductors, photodetectors, electrophotographic recording devices, capacitors, charge injection layers, Schottky diodes, planarizing layers, antistatic films, conducting substrates, conducting patterns, photoconductors, electrophotographic applications, electrophotographic recording, organic memory devices, biosensors, and biochips.

17. An optical, electronic or electro optical device, or a component thereof, comprising a polymerizable liquid crystal medium according to claim 1.

18. An optical component according to claim 17, wherein said component is an optically uniaxial film selected from an A-plate, C-plate, negative C-plate or O-plate, a twisted optical retarder, a twisted quarter wave foil, an optically biaxial film, an achromatic retarder, an achromatic quarter wave foil or half wave foil, a film having a cholesteric, smectic, nematic or blue phase, and a film having homeotropic, splayed, tilted, planar or blue-phase alignment, which is uniformly oriented or exhibits a pattern of different orientations.

19. An optical component according to claim 17, wherein said optical component is an optical compensation film for viewing angle enhancement of liquid crystal displays, a component in a brightness enhancement films, or an achromatic element in a reflective or transflective liquid crystal display.

20. The polymerizable liquid crystal medium according to claim 1, wherein the amount of compounds of formula A in the medium as a whole is from 5 to 35 wt. %.

21. The polymerizable liquid crystal medium according to claim 20, wherein said medium has a negative retardation dispersion, $R_{450}/R_{550}$, of <0.9.

22. The polymerizable liquid crystal medium according to claim 20, wherein said medium has a negative retardation dispersion, $R_{450}/R_{550}$, of <0.8.

23. The polymerizable liquid crystal medium according to claim 1, wherein the bridging group $—(B)_q—$ is selected from —C≡C—, —C≡C—C≡C—, —C≡C—C≡C—C≡C—, —C≡C—C≡C—C≡C—C≡C—,

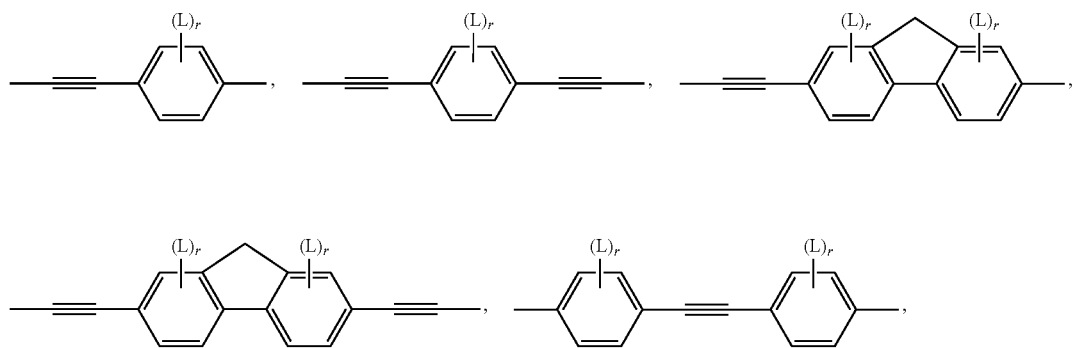

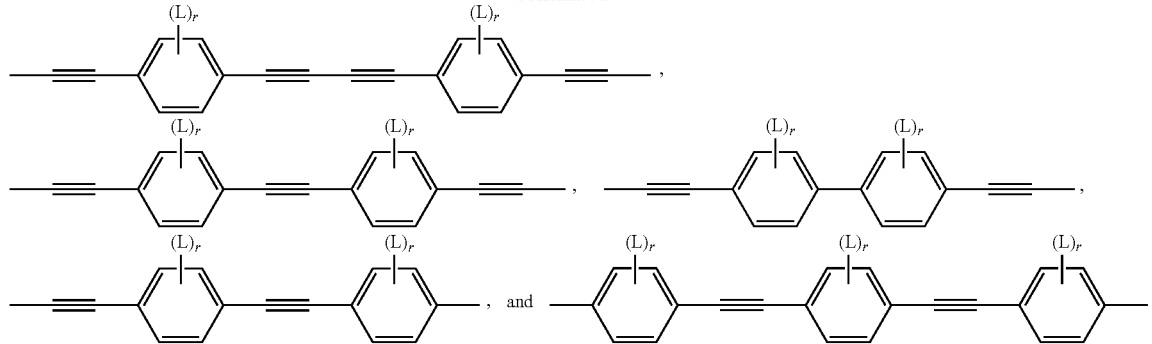

wherein
r is 0, 1, 2, 3 or 4,
L is selected from P-Sp-, F, Cl, Br, I, —CN, —NO$_2$, —NCO, —NCS, —OCN, —SCN, —C(=O)NR$^0$R$^{00}$, —C(=O)X, —C(=O)OR$^0$, —C(=O)R$^0$, —NR$^0$R$^{00}$, —OH, —SF$_5$, optionally substituted silyl, aryl with up to 12 C atoms, and straight chain or branched alkyl, alkoxy, alkylcarbonyl, alkoxycarbonyl, alkylcarbonyloxy or alkoxycarbonyloxy with up to 12 C atoms, wherein one or more H atoms are each optionally replaced by F or Cl,
R$^0$ and R$^{00}$ are independently of each other H or alkyl with 1 to 12 C-atoms, and
X is halogen.

24. The polymerizable liquid crystal medium according claim 8, wherein the polymerizable compounds of formula I are selected from the subformulae I1 to I24.

* * * * *